United States Patent [19]
Kikuchi

[11] Patent Number: 6,057,992
[45] Date of Patent: May 2, 2000

[54] TAPE CARTRIDGE EMPLOYING TAPE GUIDES WITH UPPER AND LOWER FLANGES SECURED TO THE TAPE GUIDE BY DEFORMING ENDS OF THE TAPE GUIDE

[75] Inventor: Shuichi Kikuchi, Miyagi, Japan

[73] Assignee: Sony Corporation, Japan

[21] Appl. No.: 08/583,066

[22] PCT Filed: May 15, 1995

[86] PCT No.: PCT/JP95/00924

§ 371 Date: Jan. 5, 1996

§ 102(e) Date: Jan. 5, 1996

[87] PCT Pub. No.: WO95/31809

PCT Pub. Date: Nov. 23, 1995

[30] Foreign Application Priority Data

May 13, 1994 [JP] Japan ..................................... 6-100027
May 27, 1994 [JP] Japan ..................................... 6-114820

[51] Int. Cl.[7] .......................... G11B 15/60; G11B 23/087
[52] U.S. Cl. ...................... 360/132; 360/130.21; 242/346
[58] Field of Search ................. 360/132, 130.2, 360/130.21; 226/196; 242/346

[56] References Cited

U.S. PATENT DOCUMENTS

| | | | |
|---|---|---|---|
| 4,191,345 | 3/1980 | Sato et al. | 242/346 |
| 4,204,654 | 5/1980 | Gebeke | 242/346 |
| 4,785,367 | 11/1988 | Ohya | 360/130.21 |
| 4,919,356 | 4/1990 | Nakagawa | 242/346 |
| 4,962,898 | 10/1990 | Lee | 360/132 |
| 4,991,047 | 2/1991 | Shiba et al. | 360/130.21 |
| 5,034,839 | 7/1991 | Okamura et al. | 242/346 |
| 5,453,895 | 9/1995 | Kaneda et al. | 360/130.21 |

FOREIGN PATENT DOCUMENTS

| | | | |
|---|---|---|---|
| 2817318 | 11/1978 | Germany | 242/346 |
| 58-139358 | 8/1983 | Japan | 360/130.2 |
| 61-16062 | 1/1986 | Japan | 360/130.2 |
| 3-283161 | 12/1991 | Japan | 242/346 |
| 6-44737 | 2/1994 | Japan . | |
| 7-045032 | 2/1995 | Japan . | |

*Primary Examiner*—David L. Ometz
*Attorney, Agent, or Firm*—Rader, Fishman & Grauer; Ronald P. Kananen

[57] ABSTRACT

In a tape cartridge in which a magnetic tape wound around a pair of tape reels is driven by a drive belt and in which a traveling of the tape is guided by a tape guide, there is arranged a construction which has upper and lower flanges each of which is a generally circular plate and has a center opening at a center portion and a tape guide, the tape guide including an upper fixing portion which passes through the center opening of the upper flange for having the upper flange secured thereto through caulking, a tape guide portion which guides traveling of the tape and a lower fixing portion which passes through both the center opening of the lower flange and a fixing bore of the base plate for having both the lower flange and the base plate secured thereto through caulking, so that the tape guide is stood on the base plate and guides at the tape guide portion the magnetic tape which runs between the pair of tape reels.

20 Claims, 24 Drawing Sheets

Fig. 25
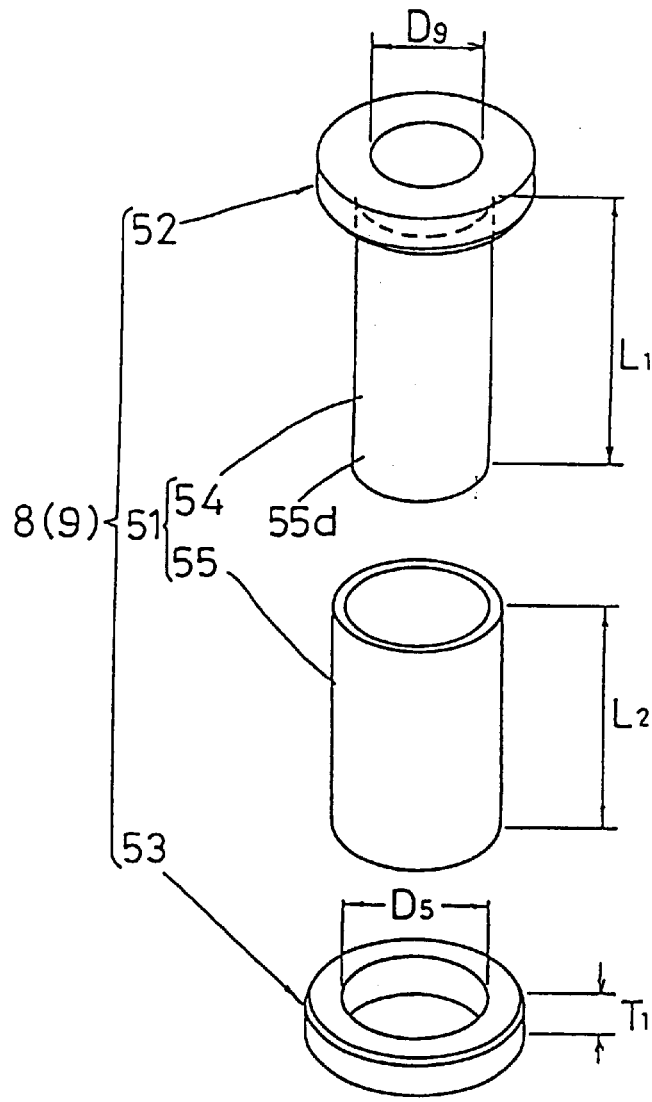
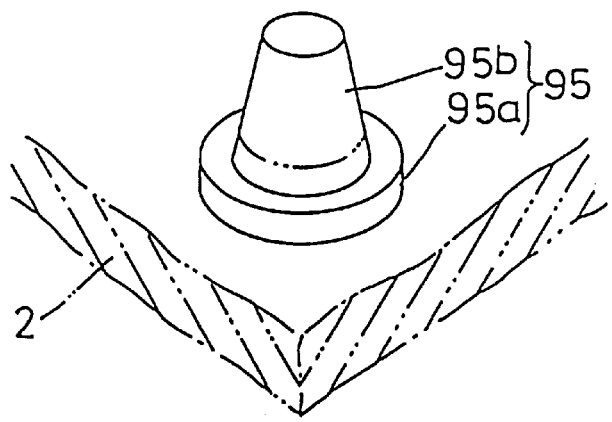

TAPE CARTRIDGE EMPLOYING TAPE GUIDES WITH UPPER AND LOWER FLANGES SECURED TO THE TAPE GUIDE BY DEFORMING ENDS OF THE TAPE GUIDE

FIELD OF THE INVENTION

The present invention relates to tape cartridges which are used as an external data storage for computers, and the like.

BACKGROUND OF THE INVENTION

There is known a tape cartridge wherein a magnetic tape wound around a pair of tape reels is frictionally driven by a drive belt. In the tape cartridge, the movement of the magnetic tape is guided by tape guides standing on a base plate. As is shown in FIG. 32, the tape guide of the tape cartridge comprises a shaft portion 101 which has an outer cylindrical surface serving as a tape running surface 101a, upper and lower flanges 102, 103 which are arranged on upper and lower ends of the shaft portion 101 to restrict upward and downward displacement of the magnetic tape (not shown) which is running on the tape running surface 101a, and a leg portion (pressfitted portion), 104 used for its standing. By press-fitting the leg portion 104 into a guide standing opening 106 formed in a base plate 105, the tape guide is stands on the base plate 105 for practical use.

In general, for production of the above-mentioned conventional tape guide, a cutting work is applied to a metal rod for shaping the shaft portion 101, the upper and lower flanges 102 and 103 and the leg portion 104, and then a polishing work is applied to the outer cylindrical surface of the shaft portion 101 for shaping a smoothed tape running surface 101a.

Since, as is described hereinabove, the above-mentioned conventional tape guide is produced by applying a cutting work to a metal rod for formation of the shaft portion 101, the upper and lower flanges 102 and 103 and then applying a polishing work to the outer cylindrical surface of the shaft portion 101 for formation of the tape running surface 101 a, the production has the following drawbacks.

(1) Because of interference by the upper and lower flanges 102 and 103, the work of polishing the outer surface of the shaft portion 101 is complicated, which causes an increase in cost of the tape guide.

(2) Because of the integrated structure, it is impossible to produce the shaft portion 101 and the upper and lower flanges 102, 103 of different materials. For example, an idea in which, for weight reduction of the tape guide, the upper and lower flanges 102 and 103 are produced of a plastic can not be practically carried out.

In order to solve the above-mentioned drawbacks, an idea may be thought out in which parts of the tape guide, which are the shaft portion 101 and the upper and lower flanges 102, 103, are separately produced and thereafter they are assembled into the tape guide. However, in this case, the work of assembling the parts and that of connecting the assembled tape guide to the base plate are complicated.

Thus, a tape cartridge which employs the tape guide having the above-mentioned drawbacks has the same drawbacks.

The present invention is provided for the purpose of solving the above-mentioned drawbacks.

SUMMARY OF THE INVENTION

According to the present invention, there is provided a tape cartridge in which a magnetic tape wound around a pair of tape reels is frictionally driven by a drive belt, the tape cartridge comprising:

a base plate;

the pair of tape reels around which the magnetic tape is wound, the tape reels being rotatably supported by respective reel shafts standing on the base plate;

upper and lower flanges each being a generally circular plate and having a center opening at a center portion; a tape guide including an upper fixing portion which passes through the center opening of the upper flange for having the upper flange secured thereto through caulking, a tape guide portion which guides the traveling of the tape and a lower fixing portion which passes through both the center opening of the lower flange and a fixing bore formed in the base plate for having both the lower flange and the base plate secured thereto through caulking, the tape guide standing on the base plate and guiding, at the tape guide portion, the magnetic tape traveling between the pair of tape reels;

the drive belt guided by a plurality of belt rollers rotatably held by respective roller shafts standing on the base plate, the drive belt frictionally driving the magnetic tape wound around the pair of tape reels;

a cover connected to the base plate in such a manner as to cover the magnetic tape on the base plate; and a lid portion arranged to selectively open and close a head insertion opening of the cover in such a manner as to enable a magnetic head to contact the magnetic tape whose traveling is guided by the tape guide.

According to the present invention, there is further provided a tape cartridge in which a magnetic tape wound around a pair of tape reels is frictionally driven by a drive belt, the tape cartridge comprising:

a base plate;

the pair of tape reels around which the magnetic tape is wound, the tape reels being rotatably supported by respective reel shafts standing on the base plate;

upper and lower flanges each being a generally circular plate and having a center opening at a center portion; a tape guide including a cylindrical guide which guides traveling of the magnetic tape and an insertion pin which has at its upper end an engaging portion whose diameter is greater than the center opening of the upper flange and at its lower end a fixing portion, the insertion pin passing through the center opening of the upper flange causing the engaging portion to engage the upper flange, the fixing portion being caulked after passing through a hollow portion of the cylindrical guide, the center opening of the lower flange and a fixing bore formed in the base plate, resulting in that the tape guide is standing on the base plate to guide, by the cylindrical guide, the magnetic tape traveling between the pair of tape reels;

the drive belt guided by a plurality of belt rollers rotatably held by respective roller shafts standing on the base plate, the drive belt' frictionally driving the magnetic tape wound around the pair of tape reels;

a cover connected to the base plate in such a manner as to cover the magnetic tape on the base plate; and a lid portion arranged to selectively open and close a head insertion opening of the cover in such a manner as to enable a magnetic head to contact the magnetic tape whose traveling is guided by the tape guide.

BRIEF DESCRIPTION OF THE DRAWINGS

FIG. 25 is an exploded perspective view of a tape guide installed in a tape cartridge, which is a tenth embodiment.

DESCRIPTION OF THE PREFERRED EMBODIMENT

Figure 1:
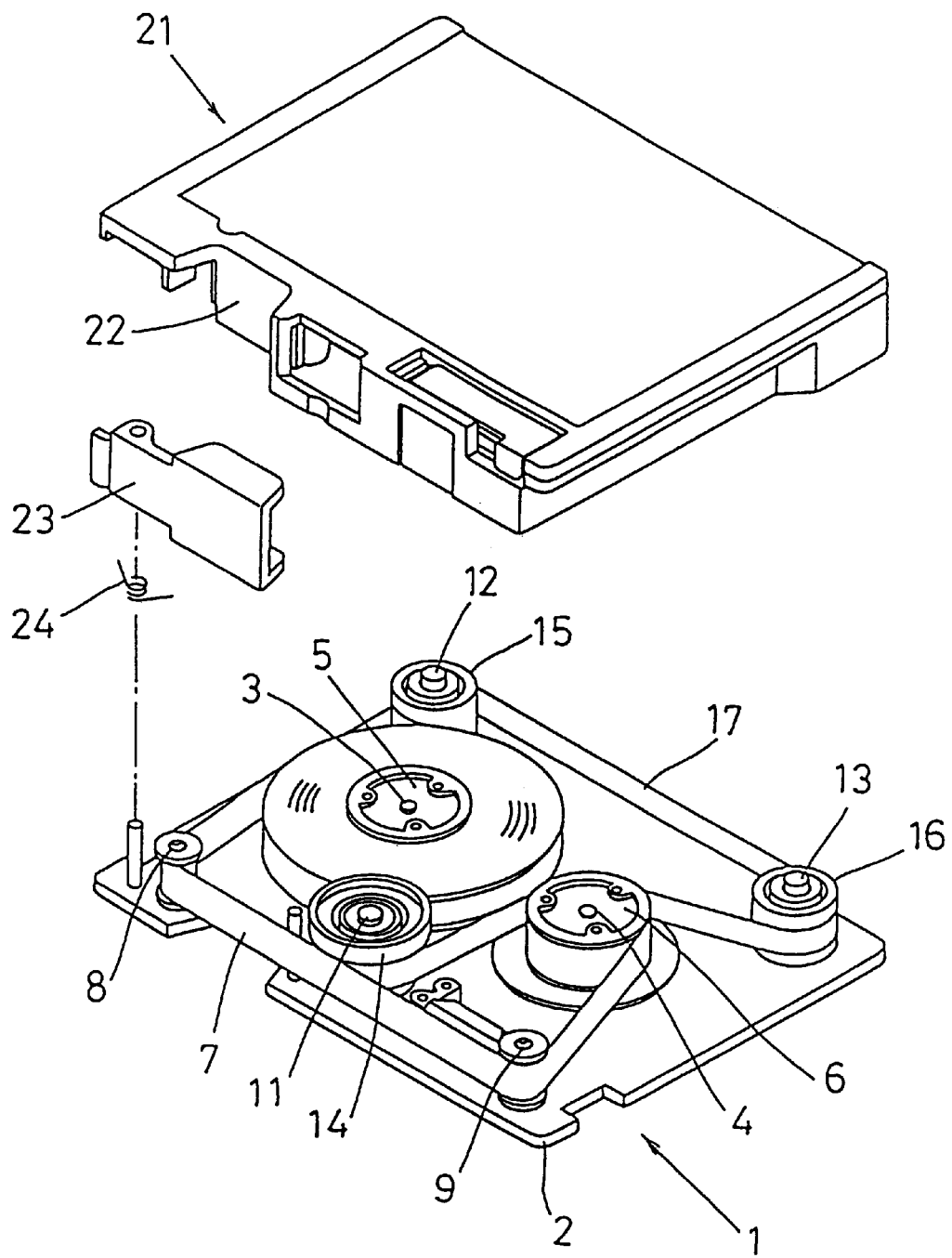
FIG. 1 is an exploded perspective view of a tape cartridge which is a first embodiment.

In the following, the present invention will be described with reference to FIGS. 1 to 31.

FIGS. 1 to 4 show a tape cartridge 1 which is a first embodiment.

The tape cartridge 1 comprises a base plate 2, a pair of tape reels 5 and 6 rotatably supported by a pair of reel shafts 3 and 4 which are put on the base plate 2, a magnetic tape 7 which is wound around the tape reels 5 and 6, and tape guides 8 and 9 which guide traveling of the magnetic tape 7, a drive belt 17 which is guided by first, second and third belt rollers 14, 15 and 16 rotatably supported by first, second and third roller shafts 11, 12 and 13 put on the base plate 2 and which frictionally drives the magnetic tape 7 wound around the paired tape reels 5 and 6, a cover 21 which is mounted to the base plate 2 in a manner to cover the magnetic tape 7 on the base plate 2, a lid member 23 which is arranged to selectively open and close a head inserting opening 22 which is formed in the cover 21 in such a manner as to enable a magnetic head to contact the magnetic tape 7 whose traveling is guided by the tape guides 8 and 9, and a spring 24 which biases the lid member 23 in a direction to close the head inserting opening 22.

Figure 2:
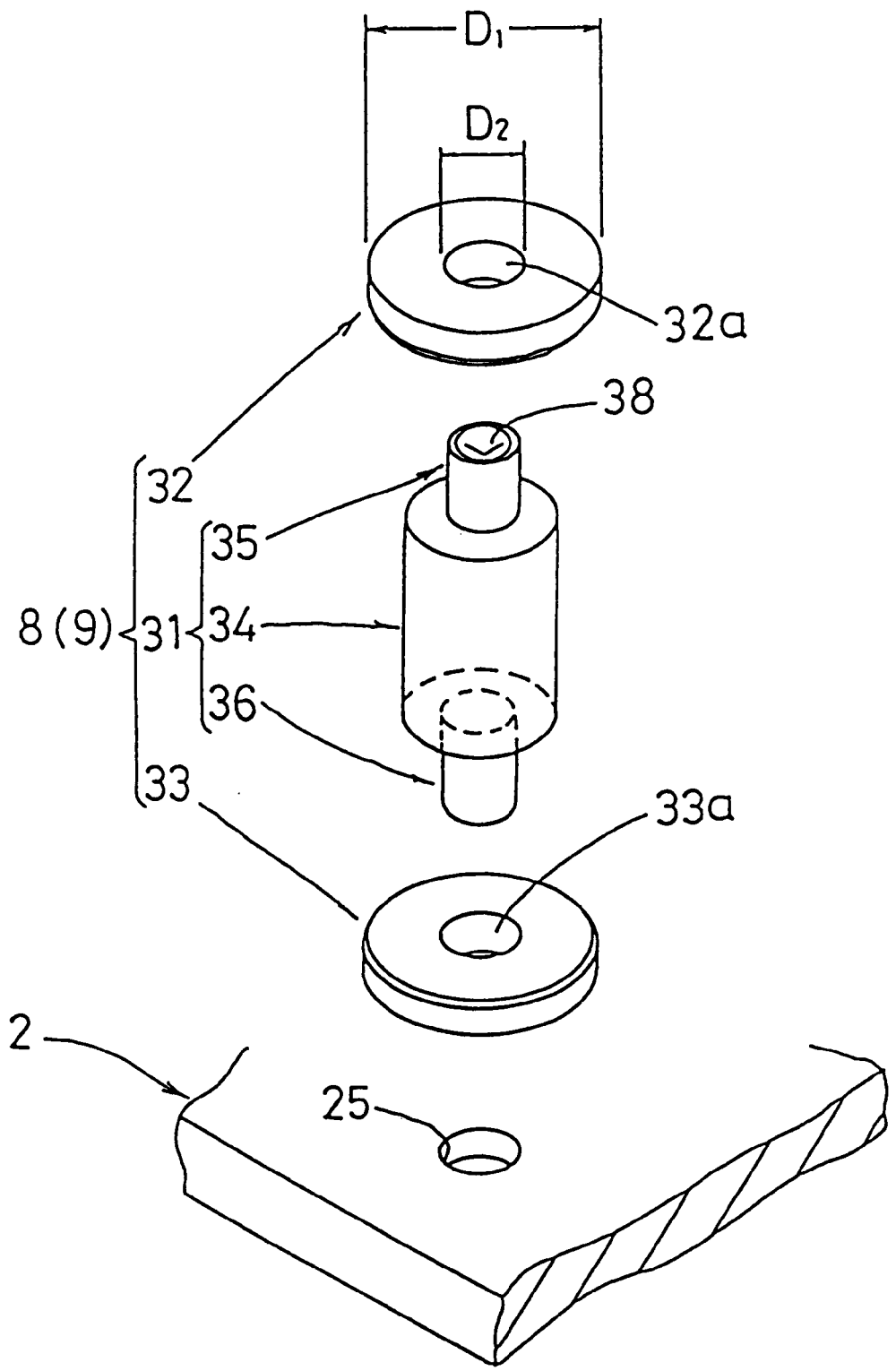
FIG. 2 is an exploded perspective view of a tape guide.

As is shown in FIG. 2, the tape guides 8 and 9 each comprise a shaft portion 31 and ring-shaped upper and lower flanges 32 and 33 which are connected to upper and lower ends of the shaft portion 31 to restrict upward and downward displacement of the magnetic tape 7, each tape guide being in the shape of a circular plate and having at a center portion a center opening 32a or 33a.

The shaft portion 31 is constructed of nonmagnetic stainless steel material, brass coated with a hard layer such as chrome or aluminum alloy treated with alumite, and the upper and lower flanges 32 and 33 are constructed of the same materials.

The shaft portion 31 is shaped to have a diameter which is smaller than an outer diameter D1 of the upper and lower flanges 32 and 33 and larger than an inner diameter D2 of them. The shaft portion comprises a tape guide portion 34 which guides the movement of the magnetic tape 7, and upper and lower fixing portions 35 and 36 which are integrally formed on upper and lower end portions of the tape guide portion 34, the diameter of the upper and lower fixing portions being smaller than the inner diameter D2 of the upper and lower flanges 32 and 33.

Figure 3:
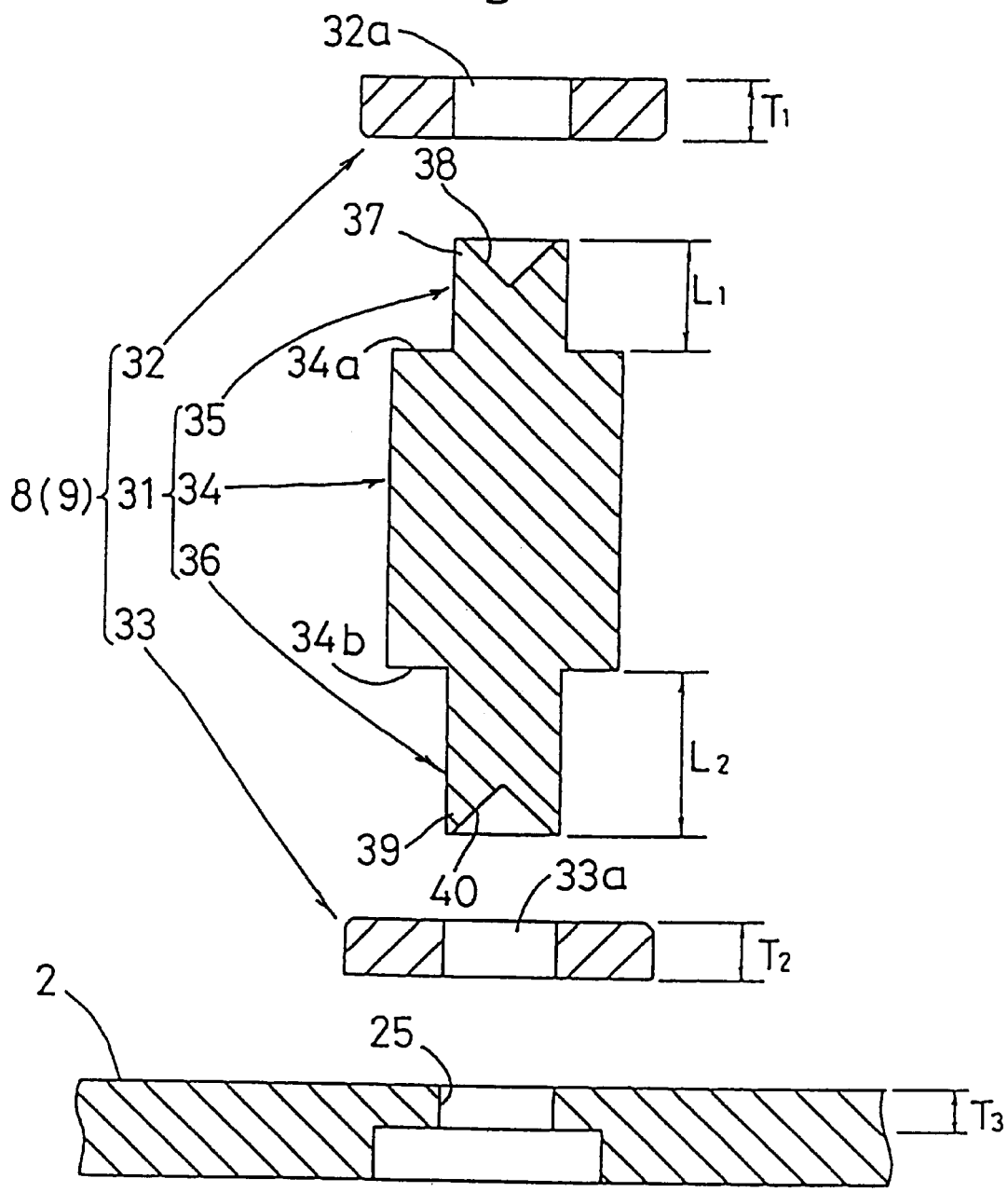
FIG. 3 is an exploded sectional view of the tape guide.
Figure 4:
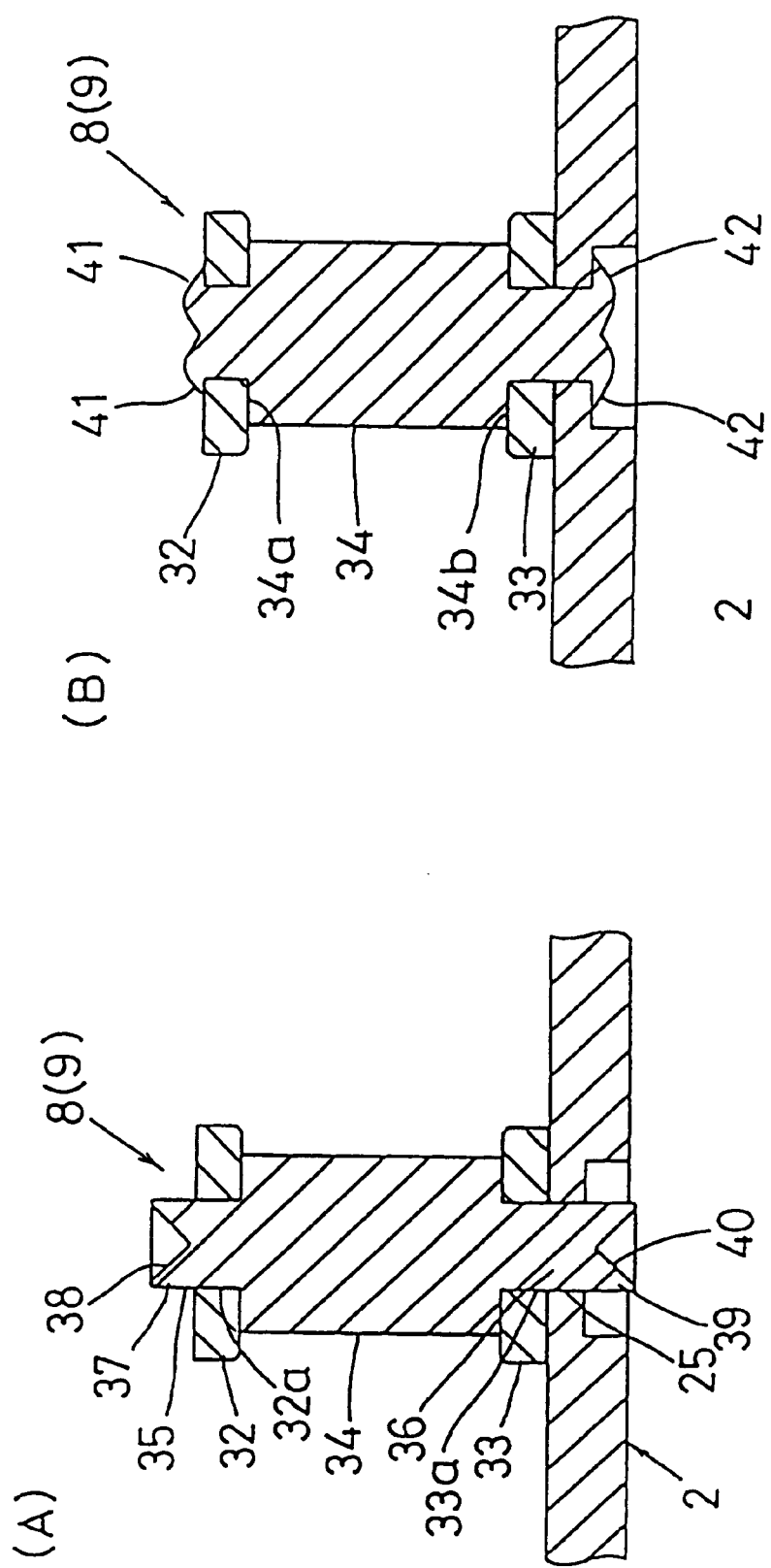
FIGS. 4(A) and 4(B) are views showing the process for assembling the tape guide.

As is shown in FIG. 3, the upper fixing portion 35 is formed at its leading end with a flange forming portion 37 which can form a flange portion (caulking portion) by which the upper flange 32 is pressed against an upper end surface 34a of the tape guide portion 34.

The length L1 of the upper fixing portion 35 is slightly larger than the thickness T1 of the upper flange 32, and by providing the leading end with a conical recess 38, the above-mentioned flange forming portion 37 is produced.

The lower fixing portion 36 is formed at its leading end with a flange forming portion 39 which can form a flange portion (caulking portion) by which the lower flange 33 and the base plate 2 are pressed against a lower end surface 34b of the tape guide portion 34.

The length L2 of the lower fixing portion 36 is slightly larger than the sum of the thickness T2 of the lower flange 33 and the depth T3 of a fixing bore (guide standing bore) 25 formed in the base plate 2, and by providing the leading end with a conical recess 40, the above-mentioned flange forming portion 39 is produced. In assembling the tape guides 8 and 9 to the base plate 2, at first, as is seen from FIG. 4(A), the upper fixing portion 35 is lightly pressed into the center opening of the upper flange 32 and the lower fixing portion 36 is lightly pressed into the center opening of the lower flange 33, and thereafter, the lower fixing portion 36 is inserted into the fixing bore 25 of the base plate 2.

Then, the leading end of the upper fixing portion 35 and that of the lower fixing portion are pressed by using a punch or die (both not shown). With this, as is seen from FIG. 4(B), the flange forming portion 37 provided at the leading end of the upper fixing portion 35 is pressed or caulked to provide an enlarged flange portion 41, so that the flange portion 41 and the upper end surface 34a of the tape guide portion 34 hold between them the upper flange 32.

Similar to the above, the flange forming portion 39 provided at the leading end of the lower fixing portion 36 is pressed or caulked to provide an enlarged flange portion 42, so that the flange portion 42 and the lower end surface 34b of the tape guide portion 34 hold between them both the lower flange 33 and the base plate 2. Thus, connection of the lower flange 33 to the tape guide portion 34 and that of the tape guide portion 34 to the base plate 2 can made at the same time.

Figure 5:
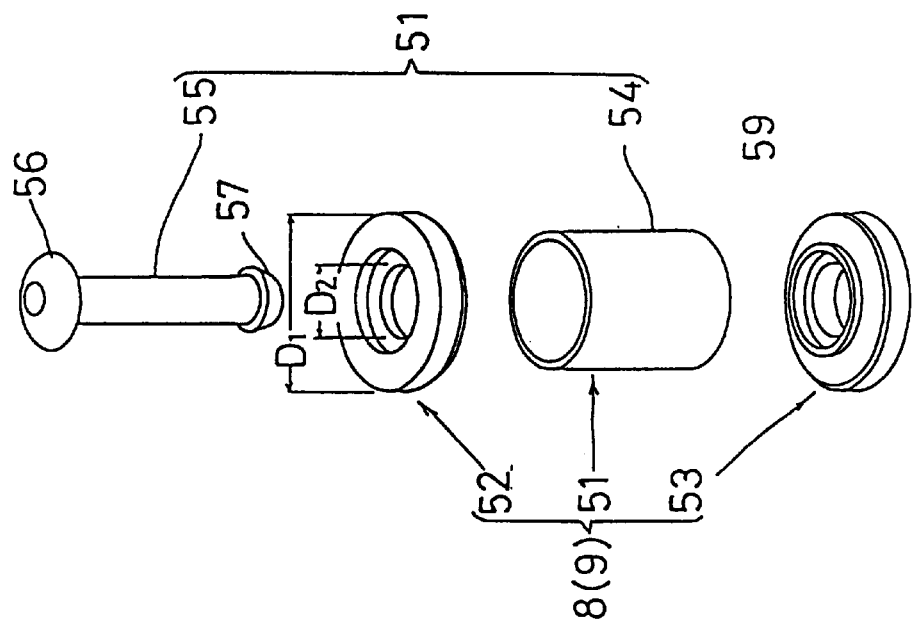
FIG. 5 is an exploded perspective view of a tape guide installed in a tape cartridge, which is a second embodiment.
Figure 6:
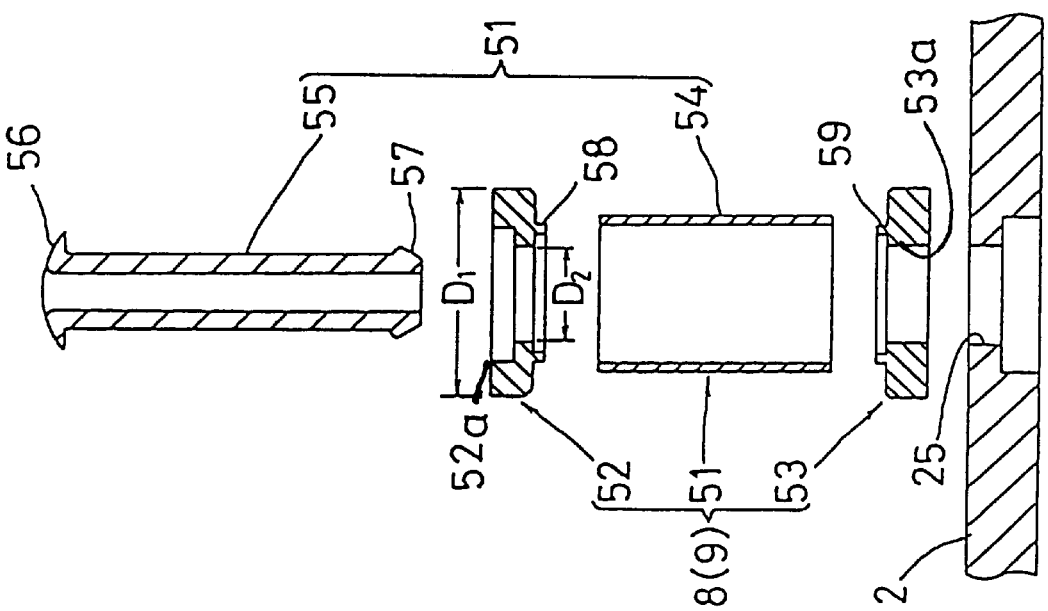
FIG. 6 is an exploded sectional view of the tape guide.
Figure 7:
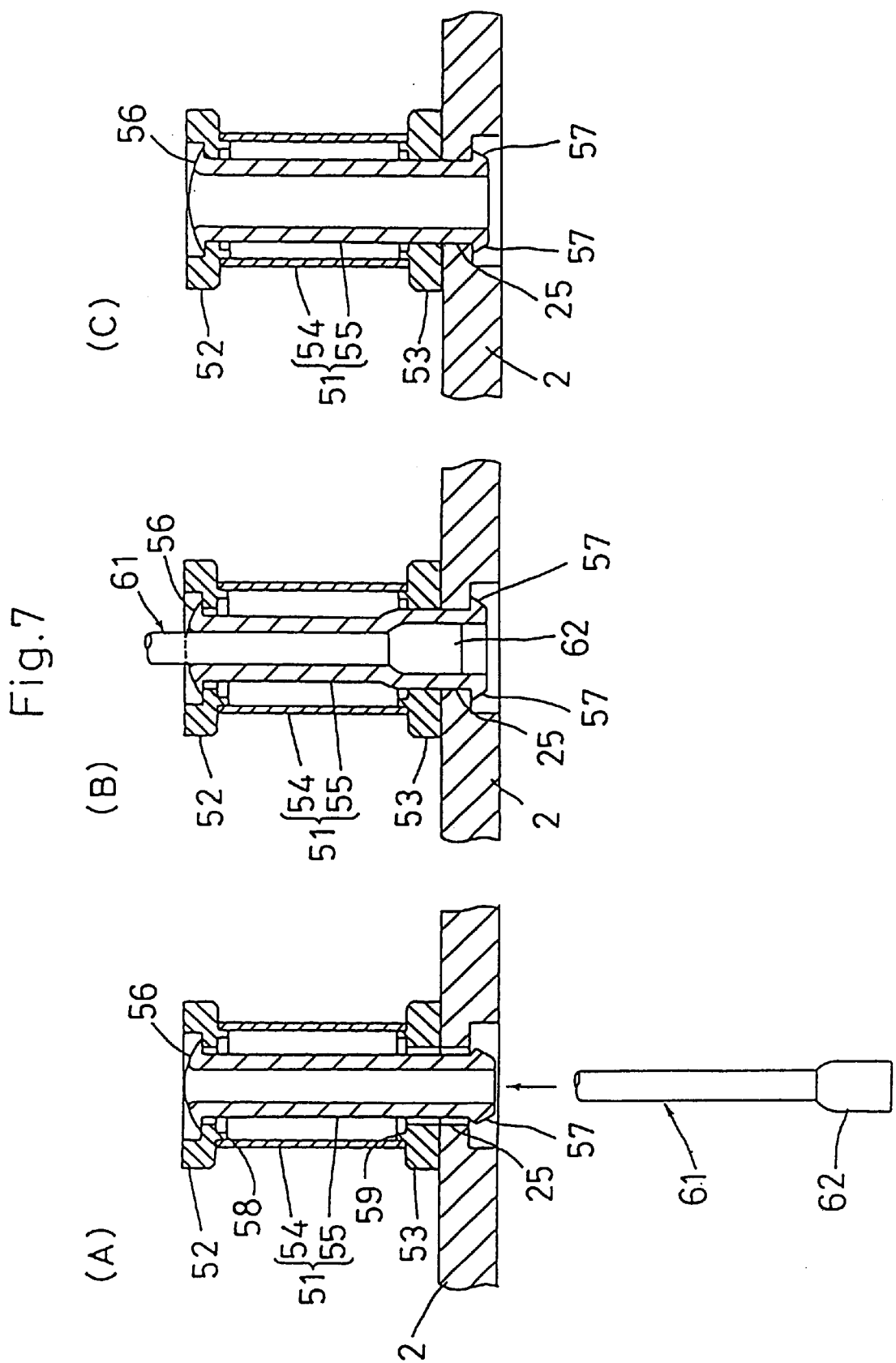
FIGS. 7(A), 7(B) and 7(C) are views showing the process for assembling the tape guide.
Figure 8:
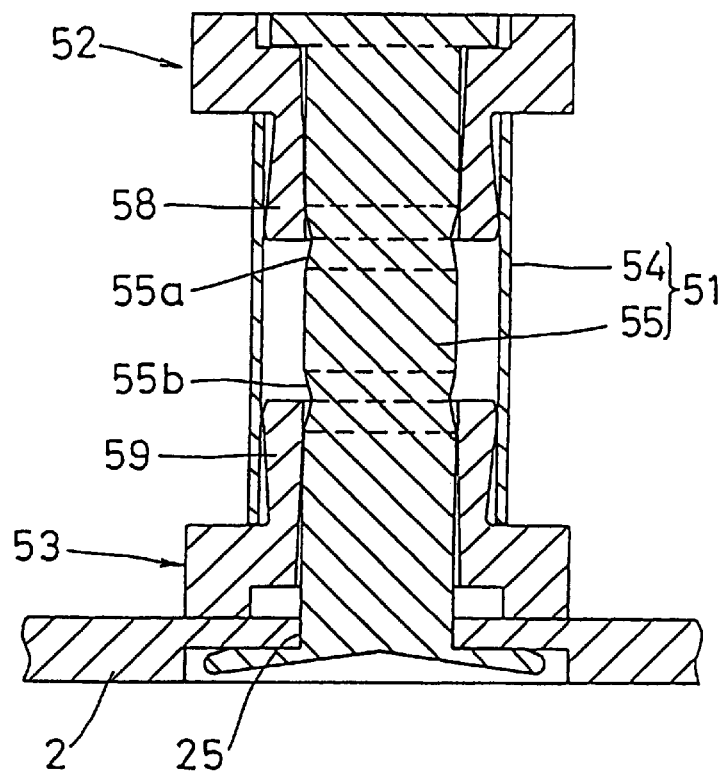
FIG. 8 is a sectional view of a tape guide installed in a tape cartridge, which is a third embodiment.

FIGS. 5 to 7 show a tape guide installed in a tape cartridge, which is a second embodiment.

The tape cartridge of the second embodiment is substantially the same in construction as the tape cartridge of the above-mentioned first embodiment except for the paired tape guides 8 and 9 standing on the base plate 2. Thus, description on the same portions will be omitted from the following.

FIGS. 5 and 6 are an exploded perspective view and a sectional view of the tape guide employed in the tape cartridge of the second embodiment.

The tape guides 8 and 9 each comprise a shaft portion 51 and ring-shaped upper and lower flanges 52 and 53 which are connected to upper and lower ends of the shaft portion 51 to restrict upward and downward displacement of the magnetic tape 7, each flange being in the shape of a circular plate and having at a center portion a center opening 52a or 53a.

The shaft portion 51 comprises a cylindrical guide 54 whose diameter is smaller than an outer diameter D1 of the upper and lower flanges 52 and 53 and larger than an inner diameter D2 of them, and an insertion pin 55 which is inserted into the cylindrical guide in such a manner that upper and lower end portions thereof are projected from the upper and lower end portions of the cylindrical guide 54.

The cylindrical guide 54 is constructed of a plastic or a metal. If made of plastic POM (polyacetal) having a high sliding ability, and having a filler dispersed therein may be used. A mixed plastic material including two or more than two thermoplastic resins, and a mixed plastic material having a filler dispersed therein or a filler-dispersed mixed plastic material coated with a nickel or chrome may be used to increase the durability of the tape running surface. If made of metal, a pipe of stainless steel, brass or aluminum, which has been cut to have a given length and whose outer surface has been treated with a barrel finishing or coated with nickel or chrome or applied with alumite treating, may be used, which has the tape running surface formed thereon.

The hollow insertion pin 55 is constructed of a metal, such as stainless steel, aluminum alloy or the like and is cylindrical.

The insertion pin 55 is shaped to be longer than the above-mentioned cylindrical guide 54, so that upon insertion of the pin into the cylindrical guide 54, the upper and lower end portions of the pin are extending from the upper and lower end portions of the cylindrical guide 54.

The insertion pin 55 is formed at its upper end with an engaging portion 56 whose diameter is larger than the inner diameter of the cylindrical guide 54 and the inner diameter D2 of the upper flange 52, and the insertion pin is formed at its lower end with a connecting portion 57 which, with an aid of the above-mentioned engaging portion 56, holds the upper and lower flanges 52 and 53, the cylindrical guide 54 and the base plate 2.

The upper and lower flanges 52 and 53 are constructed of the same material as the above-mentioned shaft portion 51.

The upper flange 52 is formed at its lower surface with an annular rib 58 which is lightly thrust into the upper end portion of the cylindrical guide 54.

The lower flange 53 is formed at its upper surface with an annular rib 59 which is lightly thrust into the lower end portion of the cylindrical guide 54.

The tape cartridge of the second embodiment has the above-mentioned structure.

Thus, as is seen from FIG. 7(A), at first, the annular rib 58 formed on the lower surface of the upper flange 52 is thrust into the upper end portion of the cylindrical guide 54 and the annular rib 59 formed on the upper surface of the lower flange 53 is thrust into the lower end portion of the cylindrical guide 54, so that the upper and lower flanges 52 and 53 and the cylindrical guide 54 are united.

Then, the insertion pin 55 is inserted into the cylindrical guide 54 by such a degree that the engaging portion 56 of the upper end of the insertion pin 55 contacts the upper surface of the upper flange 52 and the lower end portion of the pin is inserted into the fixing bore 25 of the base plate 2 causing the connecting portion 57 of the leading end of the insertion pin 55 to be projected to the lower surface side of the base plate 2.

Thereafter, with the engaging portion 56 of the upper end of the insertion pin 55 held by a tool (not shown), a diameter increasing member 61 is inserted into the cylindrical guide 54 from the lower end of the same, and then the diameter increasing member 61 is pulled upward.

When, as is seen from FIG. 7(B), the diameter increasing member 61 is pulled up to a certain position, the lower end portion of the insertion pin 55 is enlarged in diameter by a larger diameter portion 62 formed on a lower end of the diameter increasing member 61, so that the connecting portion 57 formed on the lower end of the pin becomes enlarged and in contact with the lower surface of the base plate 2.

Accordingly, between the engaging portion 56 of the upper end of the insertion pin 55 and the connecting portion 57 of the lower end of the same, the upper and lower flanges 52 and 53 and the base plate 2 are tightly sandwiched, so that the shaft portion 51 and the upper and lower flanges 52 and 53 are assembled as a tape guide standing on the base plate 2.

FIGS. 8 to 11 show a tape guide installed in a tape cartridge which is a third embodiment.

The tape cartridge of the third embodiment is substantially the same in construction as the tape cartridge of the above-mentioned first embodiment except that a pair of tape guides standing on the base plate are different in construction from those of the first embodiment. Thus, description of the same parts will be omitted from the following description.

In this embodiment, an annular rib 58 on the lower surface of the upper flange 52 and an annular rib 59 on the upper surface of the lower flange 53 have a function to achieve a tack connection between the cylindrical guide 54 and the insertion pin 55.

Figure 9:
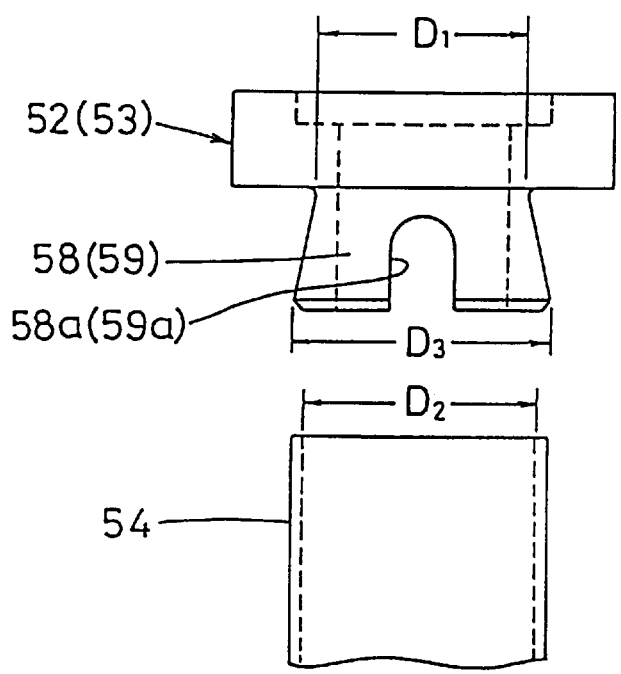
FIG. 9 is a side view of a flange.

As is shown in FIG. 9, the annular ribs 58 and 59 of the upper and lower flanges 52 and 53 are thrust into a clearance between the cylindrical guide 54 and the insertion pin 55 in such a manner that the outer surfaces of them contact intimately an inner surface of the cylindrical guide 54 and the inner surfaces of the ribs contact intimately the outer surface of the insertion pin 55 to make a tack connection between the cylindrical guide 54 and the insertion pin 55 and thus providing an easy means by which the tape guides 8 and 9 are mounted to the base plate 2.

As is shown in FIG. 9, the diameter D1 at a root portion of the annular rib 58 or 59 of th6 upper or lower flange 52 or 53 is smaller than the inner diameter D2 of the cylindrical guide 54, and the diameter D3 at a leading end portion of the ribs is greater than the inner diameter D2 of the cylindrical guide 54, and the leading end portion of the ribs is formed with a generally U-shaped slit 58a or 59a.

Figure 10:
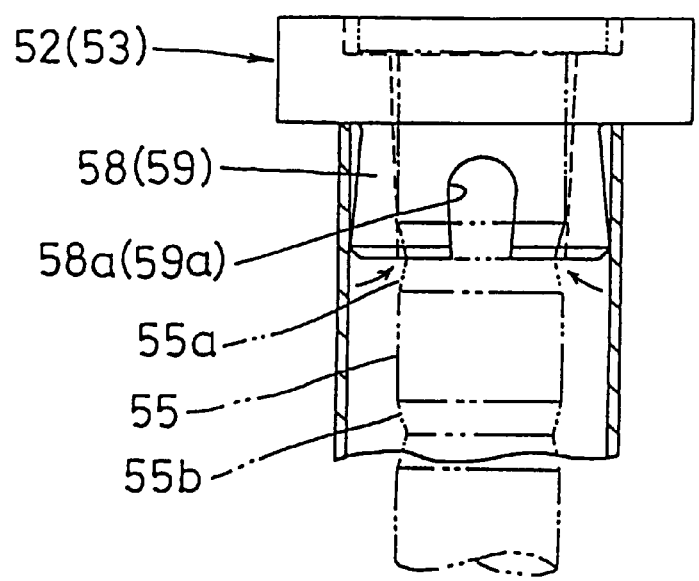
FIG. 10 is a side view of the flange in a condition wherein the flange is inserted into a cylindrical guide.

As is shown in FIG. 10, when the annular rib 58 or 59 is thrust into the cylindrical guide 54, the leading end portion of the annular rib 58 or 59 is forced to reduce its diameter and is thus flexed toward the insertion pin 55.

Figure 11:
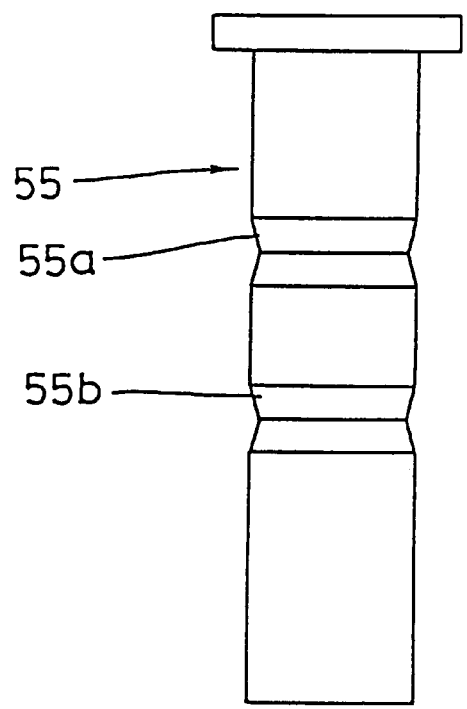
FIG. 11 is a side view of an insertion pin.

As is shown in FIG. 11, the insertion pin 55 is formed with first and second annular grooves 55a or 55b.

Accordingly, when the annular rib 58 or 59 is flexed in such a manner as has been described hereinabove, an inner surface of the leading end portion of the annular rib 58 or 59 comes into engagement with the first or second annular groove 55a or 55b, so that parts of the tape guide, which are the cylindrical guide 54, the insertion pin 55, the upper and lower flanges 52 and 53 and the like, are united. By caulking the lower end portion of the insertion pin 55, the unit is fixed to the base plate.

Figure 12:
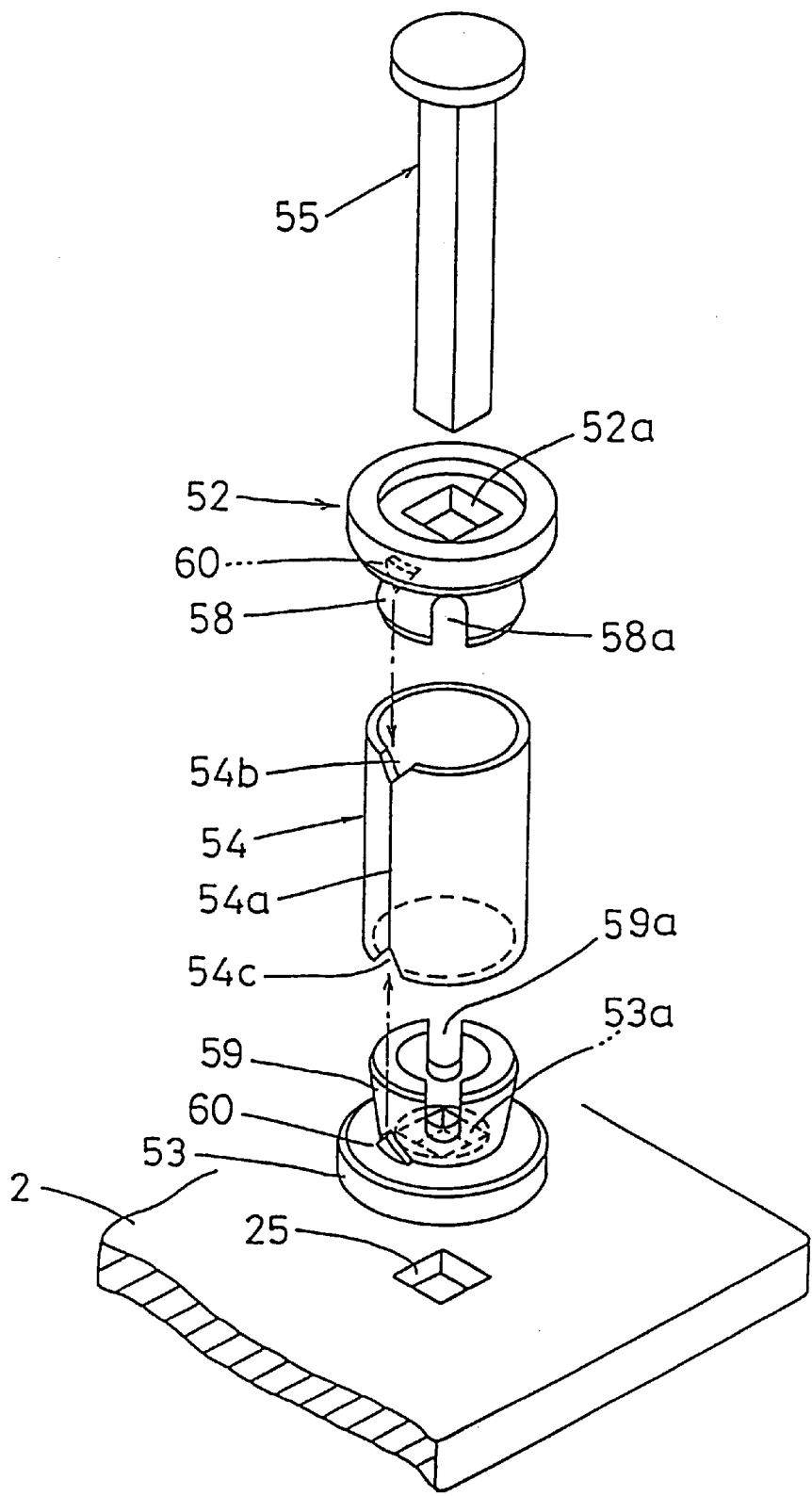
FIG. 12 is an exploded perspective view of-a tape guide installed in a tape cartridge, which is a fourth embodiment.

FIG. 12 shows a fourth embodiment.

The tape cartridge of the fourth embodiment is substantially the same in construction as the tape cartridge of the above-mentioned first embodiment except that a pair of tape guides standing on the base plate are different in construction from those of the first embodiment. Thus, description of the same parts will be omitted from the following description.

In this embodiment, the cylindrical guide 54 is connected to the insertion pin 55 in a manner not to permit relative rotation therebetween.

The cylindrical guide 54 is produced by rounding a metal plate.

The cylindrical guide 54 produced by rounding a metal plate inevitably has an opposed ends contacting part (contacting portion) 54a where opposed edges contact.

If such a contacting part 54a is present on the magnetic tape running surface, the magnetic tape would be damaged. Accordingly, for suppressing the contacting portion 54a from taking a position on the magnetic tape running surface, it is necessary to arrange the cylindrical guide 54 in a manner not to permit a rotation thereof.

For this purpose, the contacting portion 54a is formed at its upper and lower ends with respective cuts 54b and 54c, and a rotationsuppression positioning portions 60 (or portion) provided by both or at least one of the upper and lower flanges 52 and 53 are engaged with the cuts 54b and 54c, thereby to suppress rotation of the cylindrical guide 54 relative to the upper and lower flanges 52 and 53.

The insertion pin 55 is shaped to have a polygonal cross section.

Center bores 52a and 53a of the upper and lower flanges 52 and 53, into which the abovementioned polygonal insertion pin 55 is inserted, are polygonal in cross section, so that the upper and lower flanges 52 and 53 can be fixedly connected to the insertion pin 55 and at the same time the insertion pin 55 can be fixedly fitted in the polygonal fixing bore 25 of the base plate 2.

The assembling work for the tape guide is same as that of the third embodiment.

Figure 13:
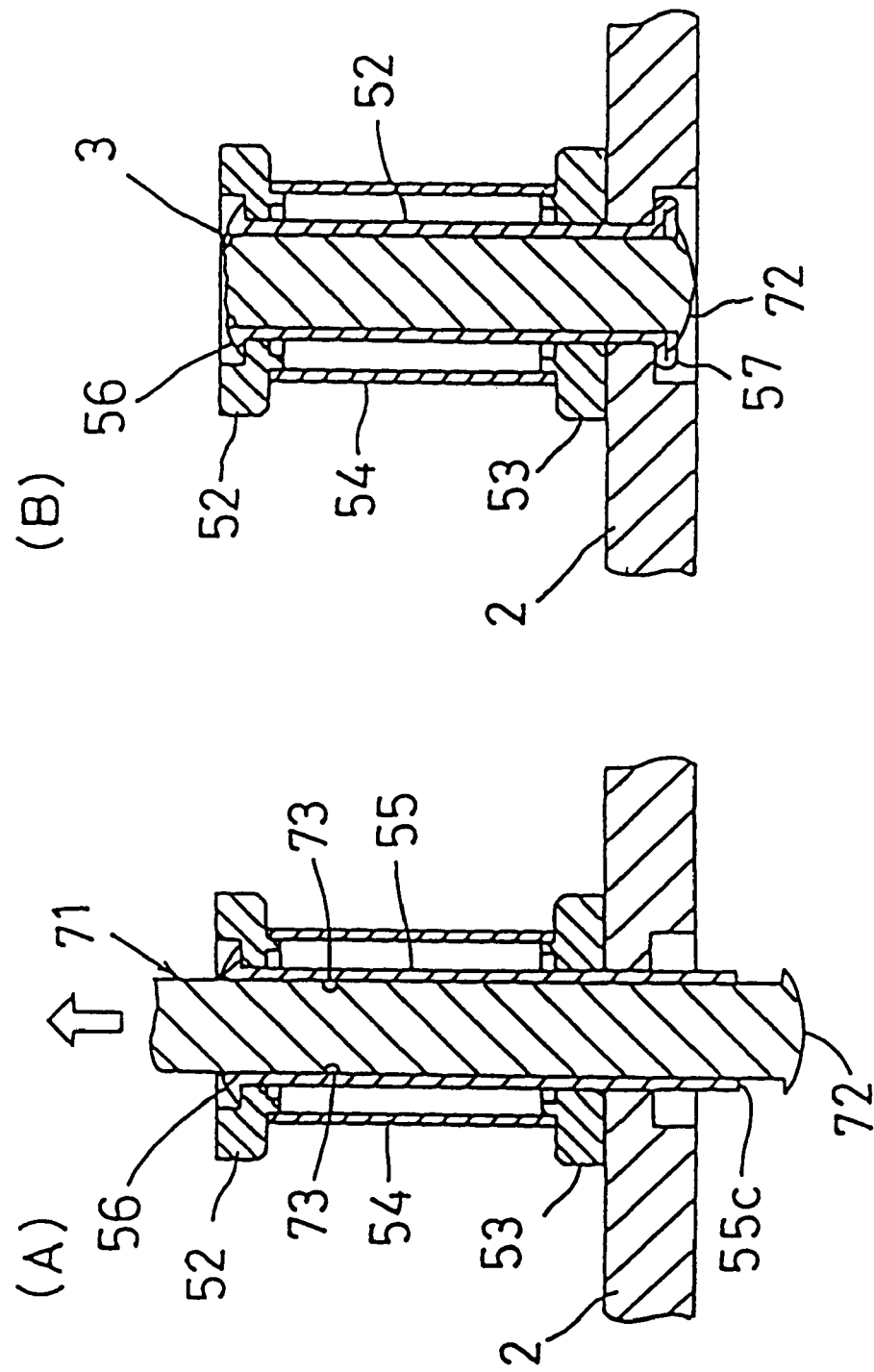
FIGS. 13(A) and 13(B) are views showing-tlM-1 process for assembling a tape guide installed in a tape cartridge which is a fifth embodiment.

FIG. 13 shows a tape guide of a fifth embodiment.

The tape cartridge of the fifth embodiment is substantially the same in construction as the tape cartridge of the above-mentioned first embodiment except that a pair of tape guides standing on the base plate are different in construction from those of the first embodiment. Thus, description of the same parts will be omitted from the following description.

In this embodiment, unlike the above-mentioned embodiment wherein the lower end portion of the insertion pin 55 has the larger connecting portion 57, the lower end portion of the insertion pin 55 is not enlarged and is used as a fixing portion forming portion. That is, for forming a fixing portion, the lower end portion is curved by a curve shaping member 71.

The lower end portion of the curve shaping member 71 is formed with a larger diameter portion 72 which is not disengaged from a lower end surface 55c of the insertion pin 55. The curve shaping member 71 is formed, at a position away from the larger diameter portion 72 by a given distance (which is equal to the length of the insertion pin 55), with a stem 73 at which the member 71 is easily cut.

Similar to the case of the second embodiment, with the engaging portion 56 of the upper end of the insertion pin 55 held by a tool (not shown), the curve shaping member 71 is pulled upward. With this, the curve shaping member 71 is slid 'in the insertion pin 55, and as is shown in FIG. 13(B), the lower end portion of the insertion pin 55 is expanded outward to form the flange-like fixing portion 57.

Thereafter, the curve shaping member 71 is cut at the stem 73. With this, similar to the case of the second embodiment, between the engaging portion 56 of the upper end of the insertion pin 55 and the connecting portion 57 of the lower end of the same, the upper and lower flanges 52 and 53, the cylindrical guide 54 and the base plate 2 are tightly sandwiched, so that a tape guide is assembled and at the same time the tape guide is stood on the base plate 2.

The remaining structure is substantially the same as that of the second embodiment, the same parts are denoted by the same numerals and description of the same parts is omitted.

Figure 14:
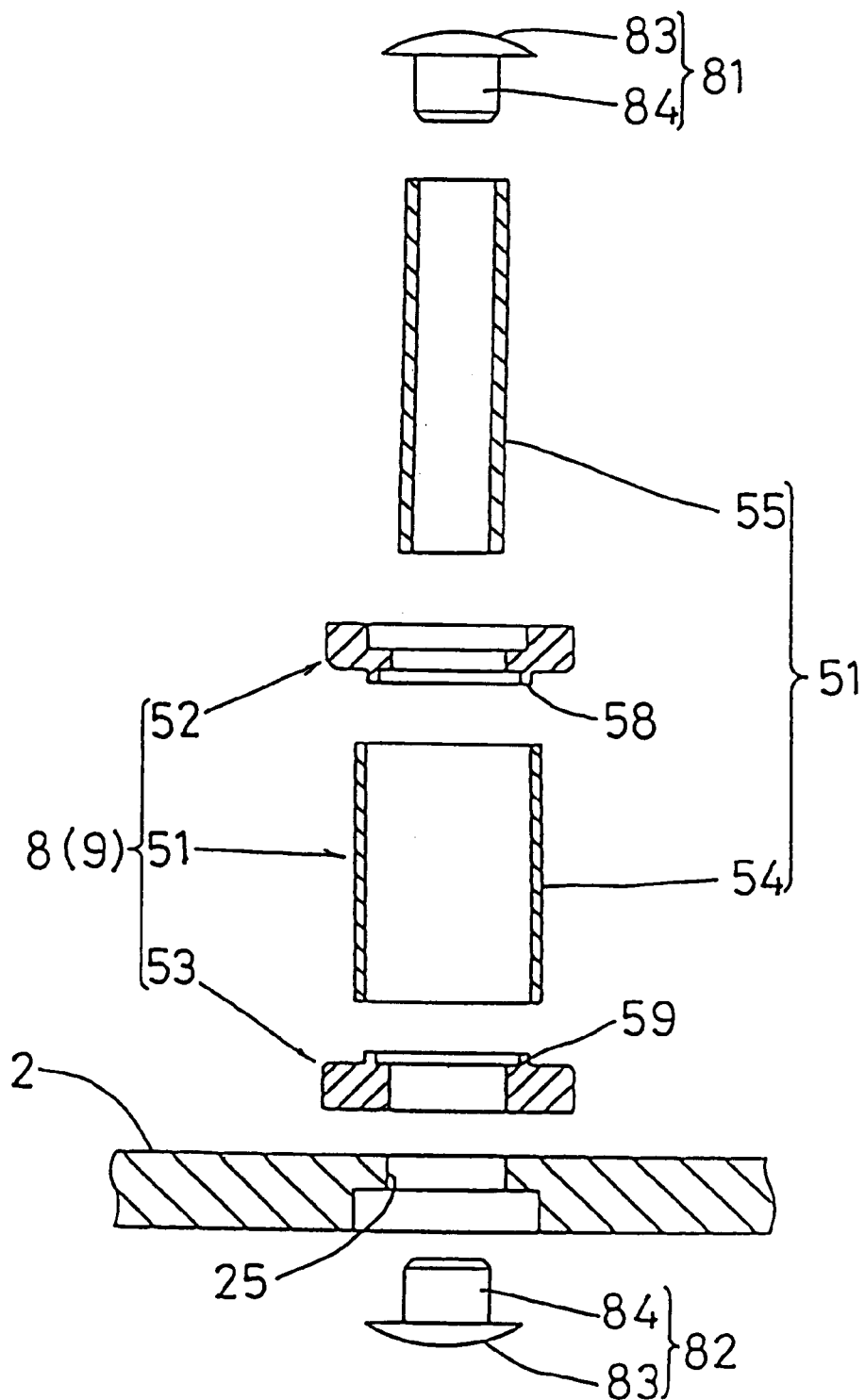
FIG. 14 is an exploded sectional view of a tape guide installed in a tape cartridge, which is a sixth embodiment.
Figure 15:
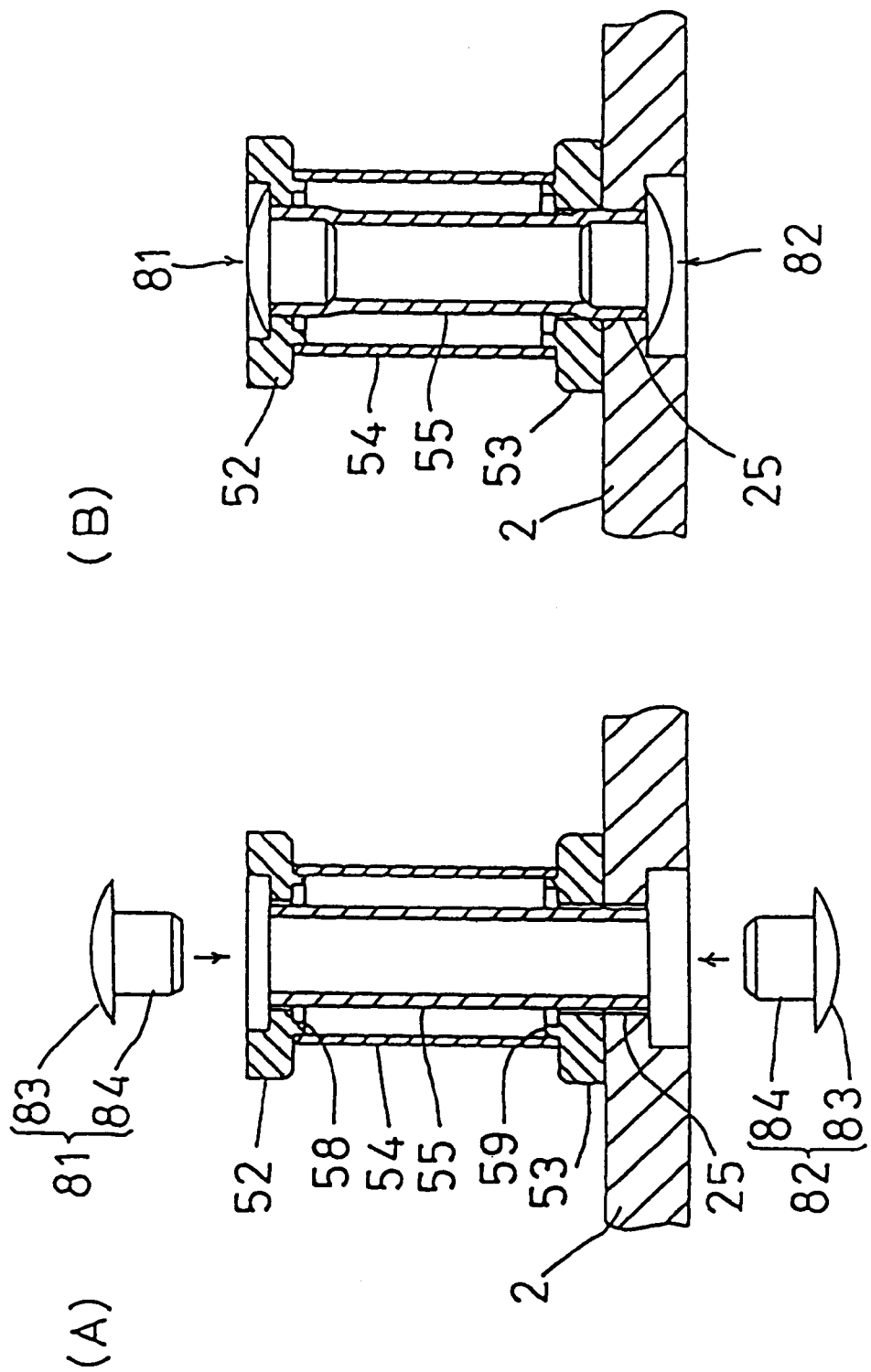
FIGS. 15(A) and 15(B) are views showing the process for assembling the tape guide.

FIGS. 14 to 15 show a sixth embodiment.

The tape cartridge of the sixth embodiment is substantially the same in construction as the tape cartridge of the above-mentioned first embodiment except that a pair of tape guides standing on the base plate are different in construction from those of the first embodiment. Thus, description of the same parts will be omitted from the following description.

In this embodiment, the shaft portion 51 of the tape guide 8 or 9 comprises a cylindrical guide 54 and a hollow insertion pin 55.

The insertion pin 55 is longer than the cylindrical guide 54.

As is seen from FIG. 15(A), the annular rib 58 on the lower surface of the upper flange 52 is lightly pressed into the upper end portion of ~he cylindrical guide 54, and the annular rib 59 on the upper surface of the lower flange 53 is lightly pressed into the lower end portion of the cylindrical guide 54 thereby to assemble and unite the upper and lower flanges 52 and 53 and the cylindrical guide 54 and to stand the unit on the fixing bore 25 of the base plate 2.

Thereafter, as is seen from FIG. 15(B), upper and lower connecting members 81 and 82 are connected to the upper and lower ends of the insertion pin 55, thereby to hold the upper and lower flanges 52 and 53, the cylindrical guide 54 and the base plate 2 therebetween.

Each of the upper and lower connecting members 81 and 82 is shaped like a mushroom and comprises a flange portion 83 whose diameter is greater than the center opening of the upper or lower flange 52 or 53, and a press-fitted portion 84 which is to be pressed into the upper or lower open end of the insertion pin 55. By pressing the press-fitted portions 84 into the upper and lower open ends of the insertion pin 55 or by pressing the press-fitted portions into the open ends with an adhesive applied to the press-fitted portions, the upper and lower connecting members are secured to the upper and lower ends of the insertion pin 55 thereby to sandwich the upper and lower flanges 52 and 53 and the cylindrical guide 54 therebetween.

If desired, one of the upper and lower connecting members 81 and 82, that is, for example, the upper connecting member 81 may be integrally formed on the upper end of the insertion pin 55.

FIGS. 16 to 19 show a seventh embodiment.

The tape cartridge of the seventh embodiment is substantially the same in construction as the tape cartridge of the above-mentioned first embodiment except that a pair of tape guides standing on the base plate are different in construction from those of the first embodiment. Thus, description of the same parts will be omitted from the following description.

FIGS. 16 to 19 are an exploded perspective view of the tape guide and views showing the process for assembling the tape guide.

Figure 16:
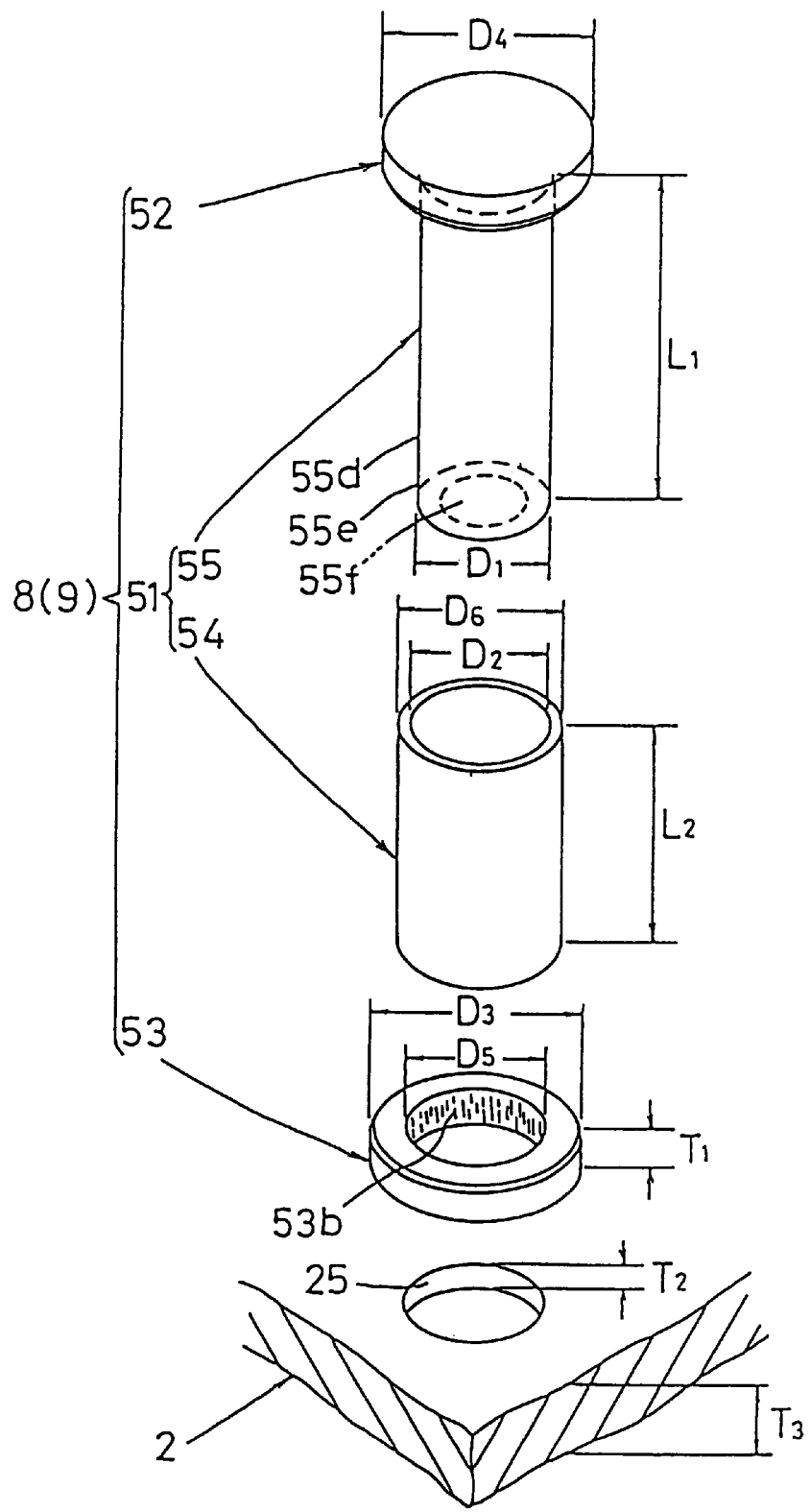
FIG. 16 is an exploded perspective view of a tape guide installed in a tape cartridge, which is a seventh embodiment.
Figure 17:
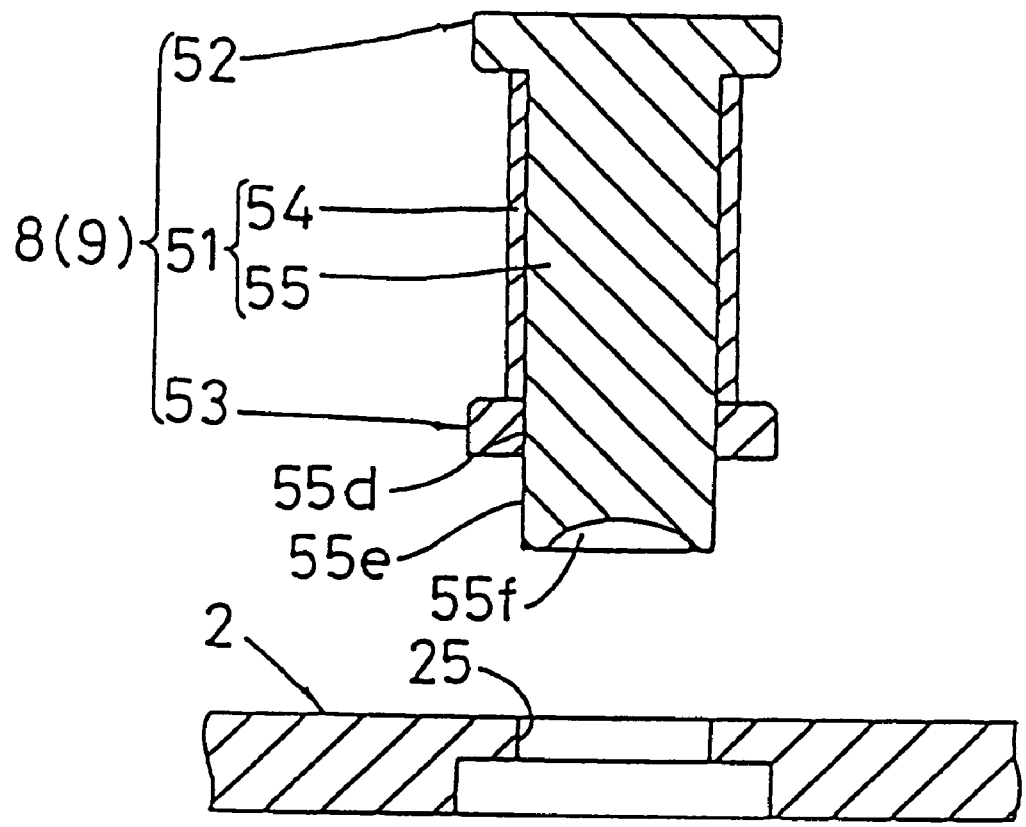
FIG. 17 is a view showing the process for assembling the tape guide.

As is shown in FIG. 16, the tape guide 8 or 9 comprises a shaft portion 51, and upper and lower flanges 52 and 53 arranged on end portions of the shaft portion 51.

The shaft portion 51 comprises a cylindrical guide 54 and a hollow insertion pin 55 which is inserted into the cylindrical guide 54.

The upper flange 52 is integrally formed on the insertion pin 55. The upper flange 52 and the insertion pin 55 are constructed of a metal or a plastic.

If made of metal, stainless steel (SUS), brass or aluminum may be used.

If made of plastic, PP, ABS or the like may be used.

In case wherein the upper flange 52 and the insertion pin 55 are constructed of a metal, such as a stainless steel, an aluminum which has been treated with alumite or the like, a cutting process and a forging process are applied to the stainless steel rod or aluminum rod for shaping the upper flange 52 and the insertion pin 55 from the rod.

An inner surface of the upper flange 52 to which contacts an edge of the magnetic tape is polished with a polishing process, so that the edge of the magnetic tape is protected from damaging.

In the case wherein the upper flange 52 and the insertion pin 55 are constructed of a plastic, the upper flange 52 and the insertion pin 55 are integrally molded through an injection molding. In the case wherein the upper flange 52 is constructed of a plastic, the surface of the upper flange 52 to which contacts the edge of the magnetic tape tends to be abrasive.

Accordingly, a chrome or nickel coating or ceramic film coating is applied to the plastic thereby to form the contact surface, to which the edge of the magnetic tape contacts, by the metal coating or ceramic film coating. With this, abrasion by the contact surface is suppressed.

The cylindrical guide 54 is constructed of a metal or a plastic.

If made of a stainless steel, brass or aluminum may be used.

If made of plastic, PP, ABS or the like may be used.

In the case wherein the cylindrical guide is constructed of a metal, such as a stainless steel, an aluminum or the like, an elongate metal pipe is produced from the above-mentioned metal, and after being subjected to an alumite treating, or applied with chrome or nickel coating, the metal pipe is cut into a piece having a desired length, and thereafter a barrel polishing and a centerless polishing are applied to tlf6 surfaces and the outer surface of the metal pipe piece. In place of the metal coating, a ceramic film may be applied to the pipe piece.

In the case wherein the cylindrical guide is constructed of a plastic, an elongate plastic pipe is constructed from the above-mentioned plastic material, and the pipe is cut into a piece having a desired length and thereafter a barrel polishing and a centerless polishing are applied to the end surfaces and the outer surface of the plastic pipe piece. The polished pipe piece is then applied with chrome (hard chrome) or nickel coating, and then a centerless polishing is applied to the outer surface of the pipe piece. In place of the metal coating, a ceramic film may be applied to the pipe piece.

The outer diameter D1 of the insertion pin 55 is somewhat greater than the inner diameter D2 of the cylindrical guide 54, so that the pin can be inserted into the cylindrical guide 54 without play.

The length L1 of the insertion pin 55 is greater than the sum of the length L2 of the cylindrical guide 54, the thickness T1 of the lower flange 53 and the depth T2 of the fixing bore 25 of the base plate 2.

Accordingly, when the insertion pin 55 is inserted into the cylindrical guide 54 to assume a position wherein the upper flange 52 is in contact with one end of the cylindrical guide 54, the end portion of the insertion pin 55 extends from the other end of the cylindrical guide 54.

Figure 18:
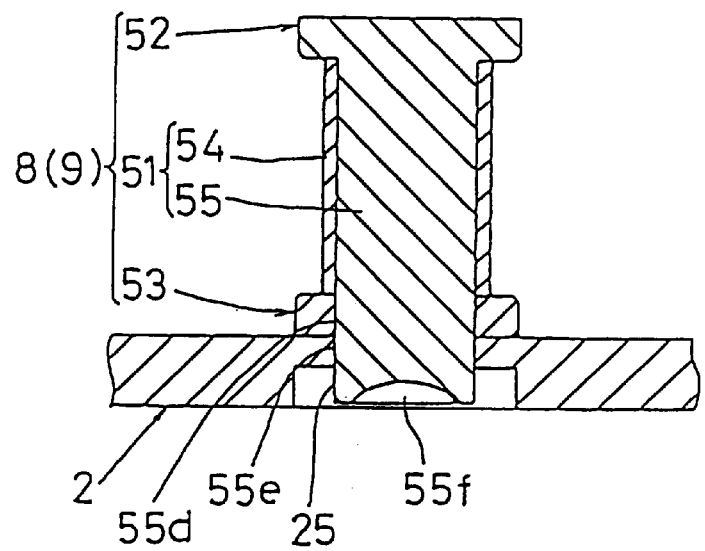
FIG. 18 is a view showing the process for assembling the tape guide.

The portion of the insertion pin 55, which projectes from the cylindrical guide 54, constitutes both a flange connecting portion 55d to which the lower flange 53 is to be connected, and an inserting portion 55e which is to be inserted into the fixing bore 25 (see FIG. 18).

A lower end surface of the insertion pin 55 is formed with a recess 55f which is used for forming a caulked portion.

The lower flange 53 is constructed of the same material as that of the upper flange 52, and the surface contacting with the edge of the magnetic tape is polished.

The lower flange 53 is shaped like a ring.

The outer diameter D3 of the lower flange 53 is substantially the same as the outer diameter D4 of the upper flange.

The inner diameter D5 of the lower flange 53 is smaller than the outer diameter D6 of the cylindrical guide 54, and somewhat larger than the outer diameter D1 of the insertion pin 55.

An inner surface 53b of the lower flange 53 is shaped rough due to presence of a plurality of axially extending ridges or a plurality of projections and depressions thereon, so that the lower flange can be lightly pressed onto and engaged with the flange connecting portion 55d of the insertion pin 55 by only the manipulating fingers of an operator.

Accordingly, as is shown in FIG. 18, when the insertion pin 55 is inserted into the cylindrical guide 54, the upper flange 52 formed on one end of the insertion pin 55 is brought into contact with one end portion of the cylindrical guide 54, and the flange connecting portion 55d and the inserting portion 55e, which are formed on the other end portion of the insertion pin 55, are projected outward from the other end portion of the cylindrical guide 54.

By pressing the lower flange 53 onto the flange connecting portion 55d of the insertion pin 55, which flange connecting portion is projected outward from the cylindrical guide 54, the insertion pin 55 and the upper and lower flanges 52 and 53 are connected to the cylindrical guide 54.

Thereafter, as is shown in FIG. 18, the inserting portion 55e of the insertion pin 55 is inserted into the fixing bore 25 of the base plate 2, so that the lower surface of the insertion pin 55 is projected to the lower side of the base plate 2.

Figure 19:
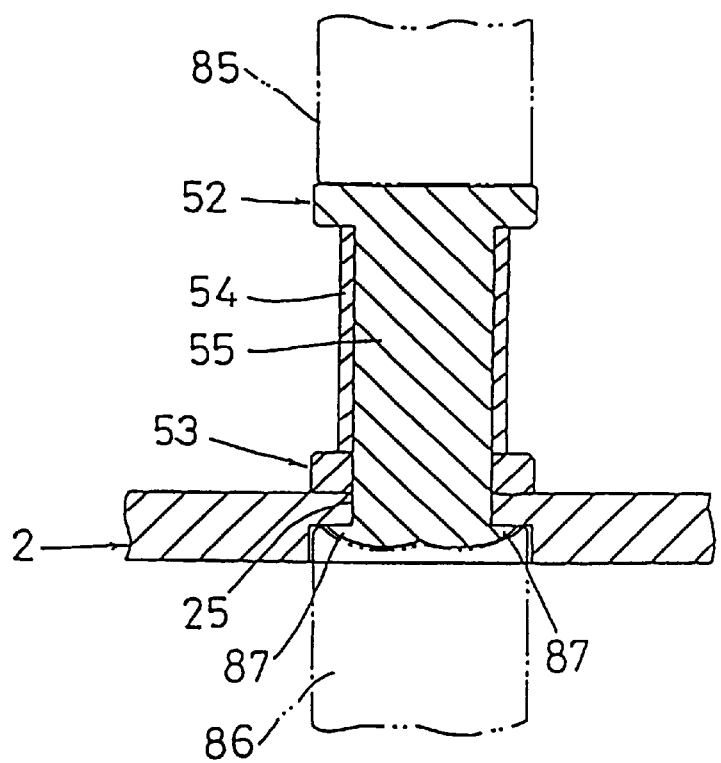
FIG. 19 is a view showing the process for assembling the tape guide.

Then, as is seen from FIG. 19, with the upper surface of the upper flange 52 kept pressed by a pressure member 85, a caulking member 86 is pressed into the caulked portion forming recess 55f formed in the lower surface of the insertion pin 55. With this, a peripheral portion of the lower end of the insertion pin 55 is enlarged and thus caulked to form a flange portion 87. Thus, the tape guide 8 or 9 comprising the cylindrical guide 54, the insertion pin 55 and the upper and lower flanges 52 and 53 can take such a position standing on the base plate 2.

Figure 20:
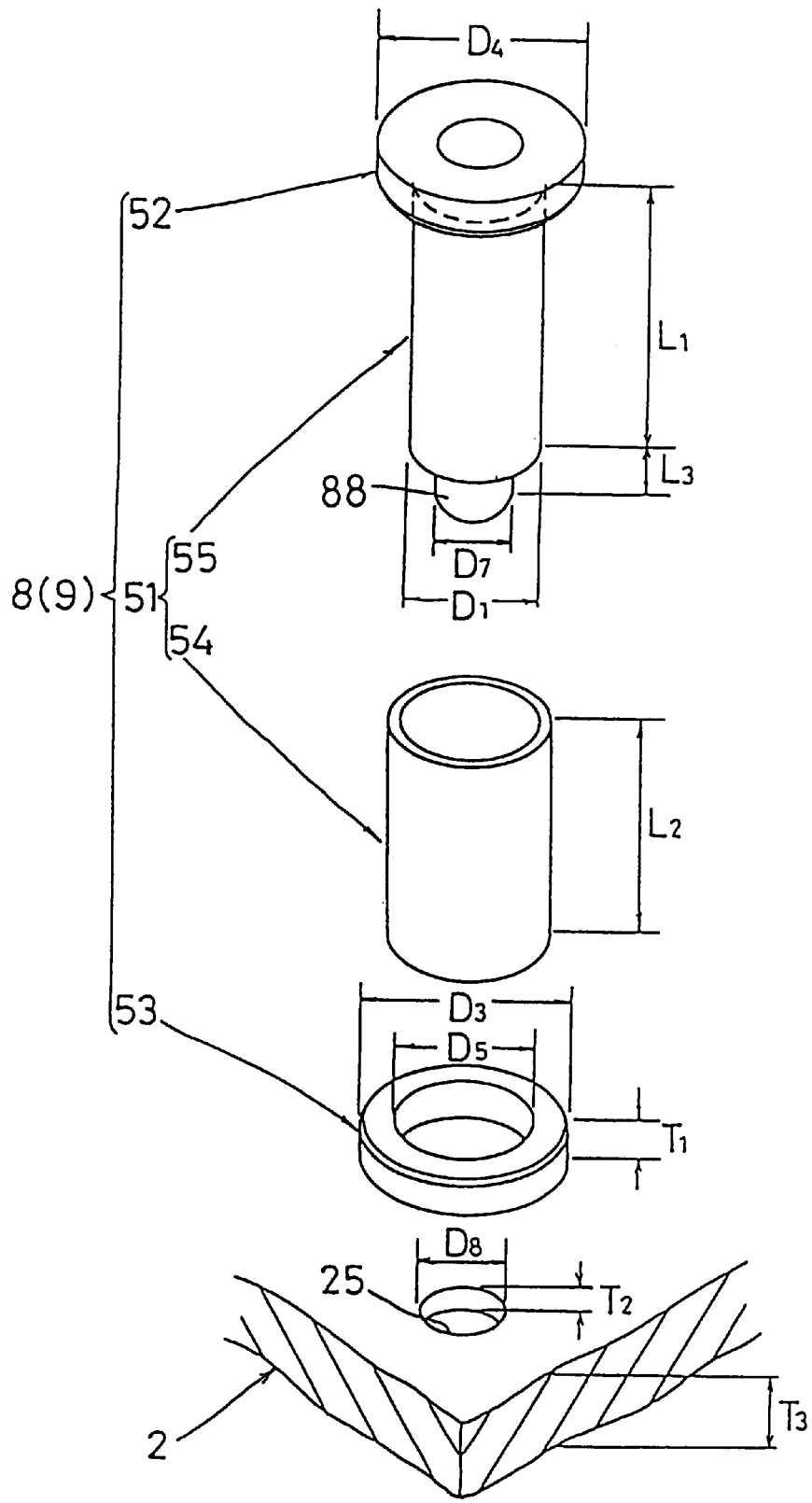
FIG. 20 is an exploded perspective view of a tape guide installed in a tape cartridge, which is an eighth embodiment.
Figure 21:
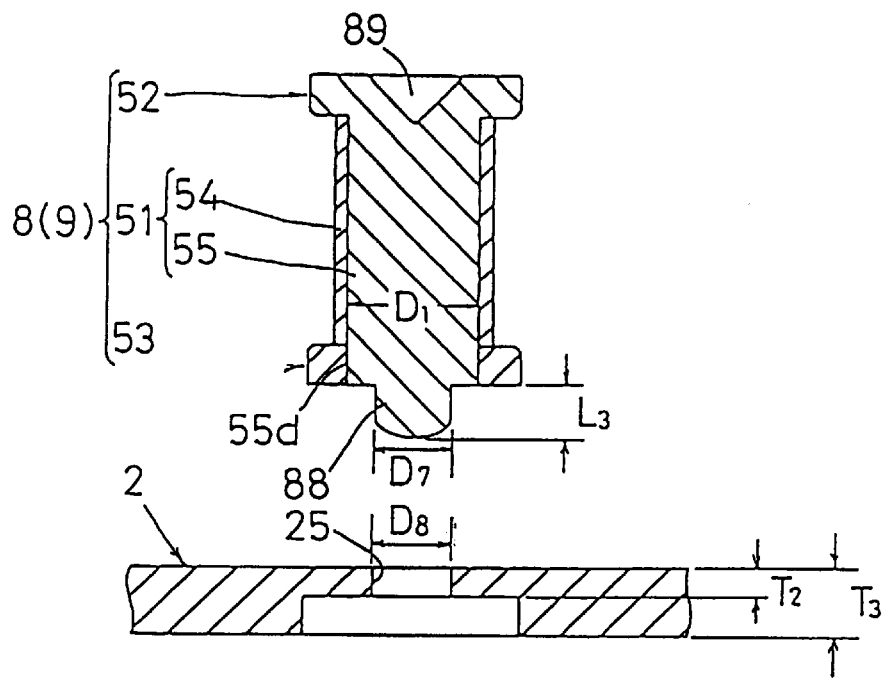
FIG. 21 is a view showing the process for assembling the tape guide.
Figure 22:
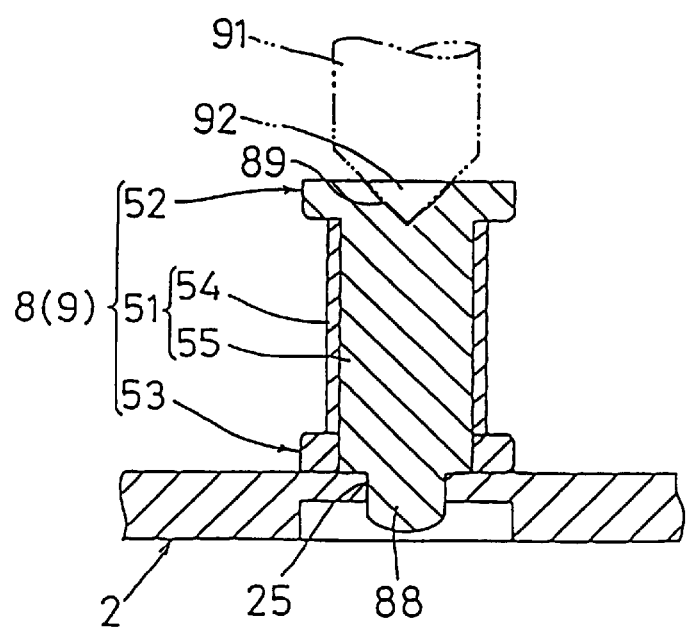
FIG. 22 is a view showing the process for assembling the tape guide.

FIGS. 20 to 22 show an eighth embodiment of the present invention.

The tape cartridge of the eighth embodiment is substantially the same in construction as the tape cartridge of the above-mentioned first embodiment except that a pair of tape guides standing on the base plate are different in construction from those of the first embodiment. Thus, description of the same parts will be omitted from the following description.

In this embodiment, the insertion pin 55 has at one end an upper flange 52 and at the other end a leg portion (press-fitted portion) 88 used for its standing.

The upper flange 52 and the leg portion 88 are integrally formed on the insertion pin 55.

The length L1 of the insertion pin 55 is generally equal to the sum of the length L2 of the cylindrical guide 54 and the thickness T1 of the lower flange 53.

Accordingly, when the insertion pin 55 is inserted into the cylindrical guide 54 to such an extent that the upper flange 52 contacts one end portion of the cylindrical guide 54, the end portion of the insertion pin 55 and the leg portion 88 are projected outward from the other end of the cylindrical guide 54.

The portion of the insertion pin 55, which projects outward from the cylindrical guide 54, constitutes the flange connecting portion 55d (see FIG. 21).

The outer diameter D7 of the leg portion 88 is smaller than the outer diameter D1 of the insertion pin 55, but slightly larger than the diameter D8 of the fixing bore 25 of the base plate 2.

The length L3 of the leg portion 88 is greater than the depth T2 of the fixing bore 25, but smaller than the thickness T3 of the base plate 2.

The upper flange 52 is formed on its upper surface with a conical punch receiving surface 89 which can receive a punch of a press device for standing the tape guide on the base plate.

Accordingly, when, as is seen from FIG. 22, the insertion pin 55 is inserted into the cylindrical guide 54 to such an extent that the upper flange 52 formed on one end of the insertion pin 55 contacts the end of the cylindrical guide 54, the flange connecting portion 55d and the leg portion 88, which are formed on the other end portion of the insertion pin 55, project outward from the other end of the cylindrical guide 54.

By pressing the lower flange 53 onto the flange connecting portion 55d of the insertion pin 55, which flange connecting portion projects outward from the cylindrical guide 54, the cylindrical guide 54, the insertion pin 55 and the upper and lower flanges 52 and 53 are assembled.

With the leg portion 88 placed in an upper end of the fixing bore 25 of the base plate 2, a punch 91 of a guide pin standing press device is led into the conical punch receiving surface 89 to tap against the punch receiving surface 89 with its tip, the leg portion 88 is pressed into the fixing bore 25 of the base plate 2, so that the tape guide 8 or 9 is stood on the base plate 2.

The punch 91 is formed at its tip with a conical pressing portion 92 which is identical in shape with the punch receiving surface 89.

Accordingly, in case wherein the insertion pin 55 is pressed by the punch 91, the pressing portion 92 is intimately received in the punch receiving surface and the pressing is made keeping the insertion pin 55 in alignment with the punch 91. Thus, the leg portion 88 can be assuredly pressed into the fixing bore 25.

Figure 23:
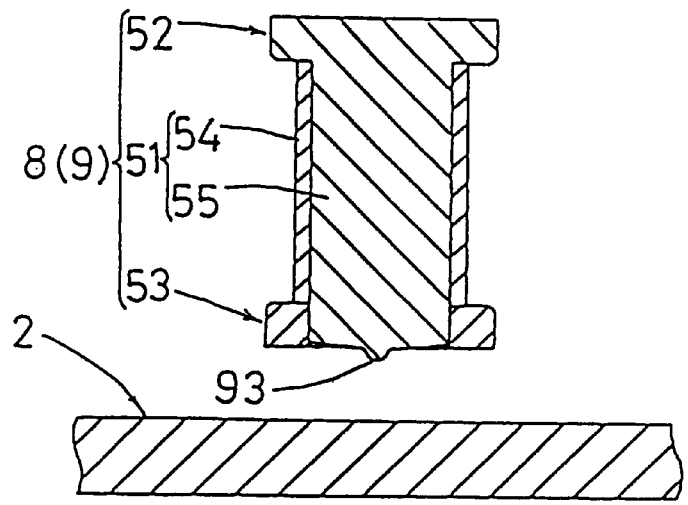
FIG. 23 is a sectional view of a tape guide installed in a tape cartridge, which is a ninth embodiment.
Figure 24:
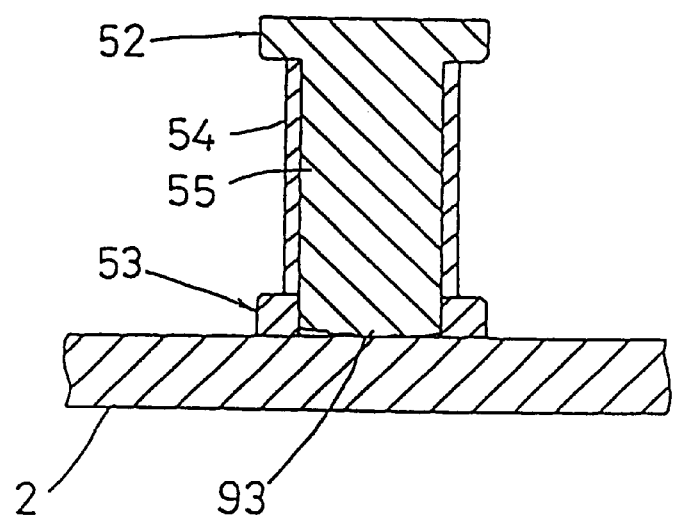
FIG. 24 is a sectional view showing the process for assembling the tape guide.

FIGS. 23 to 24 show a ninth embodiment of the present invention.

The tape cartridge of the ninth embodiment is substantially the same in construction as the tape cartridge of the above-mentioned first embodiment except that a pair of tape guides standing on the base plate are different in construction from those of the first embodiment. Thus, description of the same parts will be omitted from the following description.

In this embodiment, one end of the insertion pin 55 is formed with a projection 93 which is used for welding.

With the projection 93 pressed against and contacted to the base plate 2, an electric current is applied between the insertion pin 55 and the base plate 2 to heat and melt the projection 93 thereby to weld the insertion pin 55 to the base plate 2.

Accordingly, both the insertion pin 55 and the base plate 2 are constructed of a metal which enables an electric welding.

The remaining construction is generally the same as that of the eighth embodiment.

Figure 26:
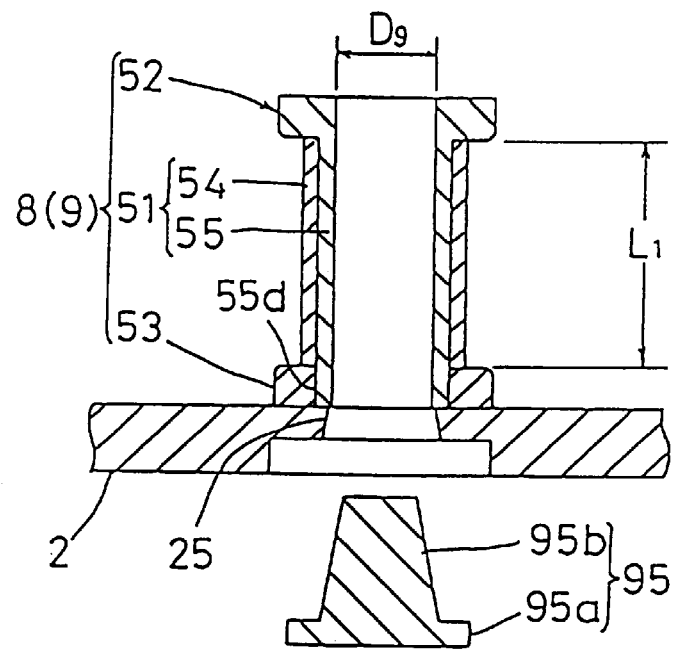
FIG. 26 is a view showing the process for assembling the tape guide.
Figure 27:
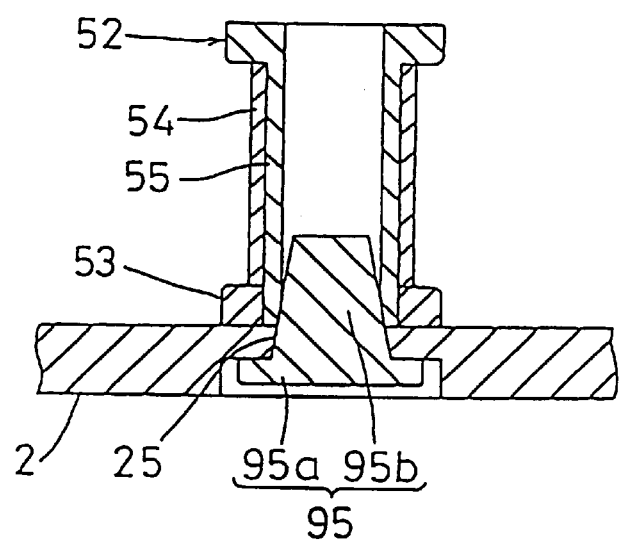
FIG. 27 is a view showing the process for assembling the tape guide.
Figure 28:
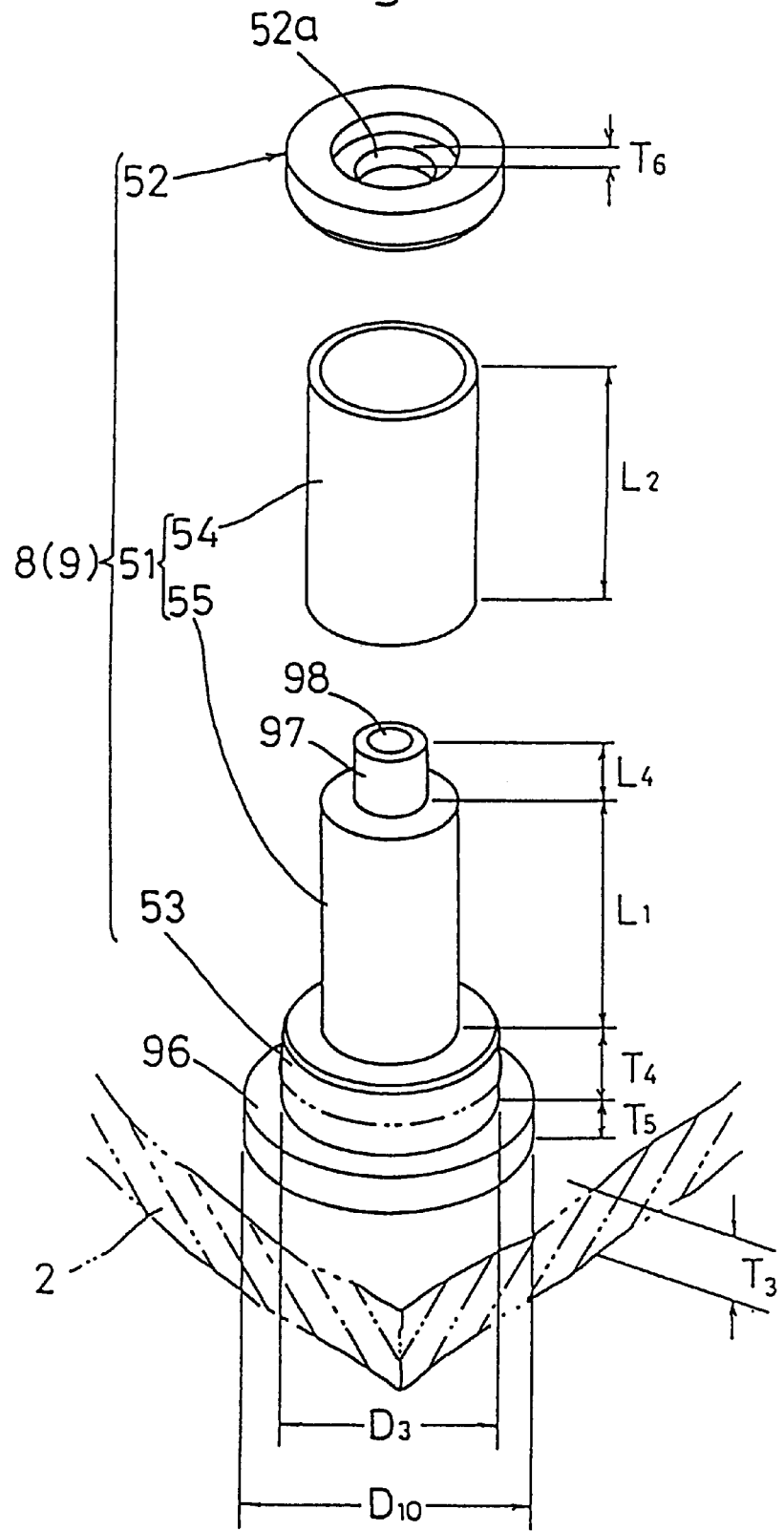
FIG. 28 is an exploded perspective view of a tape guide installed in a tape cartridge, which is an eleventh embodiment.

FIGS. 25 to 27 show a tenth embodiment of the present invention.

The tape cartridge of the tenth embodiment is substantially the same in construction as the tape cartridge of the above-mentioned first embodiment except that a pair of tape guides standing on the base plate are different in construction from those of the first embodiment. Thus, description of the same parts will be omitted from the following description.

In this embodiment, the insertion pin 55 cylindrical and shaped hollow.

The inner diameter D9 of the insertion pin 55 is smaller than the inner diameter D5 of the lower flange 53.

The insertion pin 55 is integral with the upper flange 52.

The length L1 of the insertion pin 55 is generally equal to the sum of the length L2 of the cylindrical guide 54 and the thickness T1 of the lower flange 53.

Accordingly, when the insertion pin 55 is inserted into the cylindrical guide 54 to such a position that the upper flange 52 contacts one end of the cylindrical guide 54, one end of the insertion pin 55 projects outward from the other end of the cylindrical guide 54.

The portion of the insertion pin 55, which projects outward from the cylindrical guide 54, constitutes the flange connecting portion 55d to which the lower flange 53 is connected.

Accordingly, when the insertion pin 55 is inserted into the cylindrical guide 54, and when, with the flange connecting portion 55d on one end of the cylindrical pin 55 projecting from the end portion of the cylindrical guide 54, the lower flange 53 is pressed onto the flange connecting portion 55d, the cylindrical guide 54, the insertion pin 55 and the upper and lower flange portions 52 and 53 are assembled.

Then, as is seen from FIG. 26, with the insertion pin 55 placed in the fixing bore 25 of the base plate 2, and with the upper surface of the upper flange 52 pressed, a fixing member 95 is pressed into the lower end portion of the insertion member 55 from the lower side of the base plate 2. Thus, the tape guide 8 or 9 is stood on the base plate 2.

The fixing member 95 comprises a flange portion 95b and a pressed-in portion 95a.

The flange portion 95a is formed larger in diameter than the fixing bore 25 of the base plate 2.

The pressed-in portion 95b is formed smaller in diameter at the top than the fixing bore 25 and is conical, the diameter gradually increasing towards the flange portion 95b.

By pressing the leading end of the pressed-in portion 95b into the hollowed lower end portion of the insertion pin 55, the tape guide 8 or 9 can stand on the base plate 2.

The remaining structure is substantially the same as that of the above-mentioned embodiments.

FIGS. 28 to 31 show an eleventh embodiment of the present invention.

The tape cartridge of the eleventh embodiment is substantially the same in construction as the tape cartridge of the above-mentioned first embodiment except that a pair of tape guides standing on the base plate are different in construction from those of the first embodiment. Thus, description of the same parts will be omitted from the following description.

Unlike the above-mentioned seventh to tenth embodiments wherein the upper flange 52 is integrally formed on the insertion pin 55, in this embodiment, the lower flange 53 is integrally formed on the insertion pin 55.

The insertion pin 55 is integrally formed at one end portion (lower end portion) with the lower flange 53 and a pressed-in portion 96 and at the other end portion (upper end portion) with a caulking fixing portion 97.

The length L1 of the insertion pin 55 is generally equal to the length L2 of the cylindrical guide 54.

The lower flange 53 is shaped to have an outer diameter of D3 and a thickness of T4.

The lower end of the lower flange 53 is formed with a pressed-in portion 96 whose diameter D10 is greater than the diameter D3 of the lower flange.

The thickness T5 of the pressed-in portion 96 is about ½ to ⅓ of the thickness T3 of the base plate 2.

The length L4 of the caulking fixing portion 97 is greater than the depth T6 of the center bore of the upper flange 52, and the upper surface of the fixing portion is formed with a recess 98 which is used for forming a caulked portion.

Figure 29:
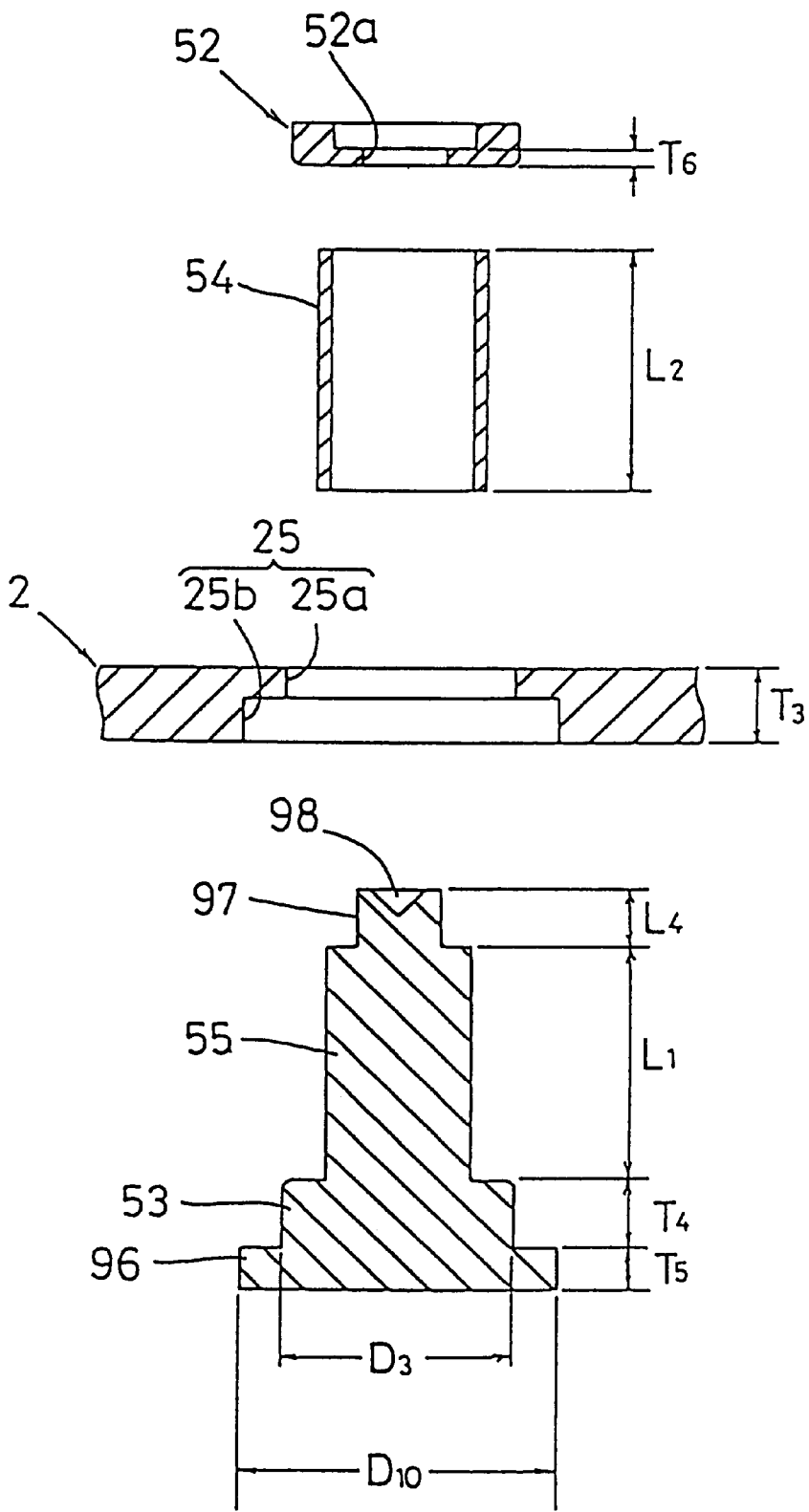
FIG. 29 is a view showing the process for assembling the tape guide.

As is shown in FIG. 29, the base plate 2 is formed with a fixing bore 25 which is used for standing a guide thereon. The fixing bore 25 comprises a flange engaging bore 25a with which the lower flange 53 is engaged and a pressed portion engaging bore 25b.

The remaining structure is substantially the same as that of the above-mentioned embodiments.

Accordingly, when, as is shown in FIG. 29, the insertion pin 55 is inserted from the lower side of the base plate 2, the lower flange 53 becomes engaged with the flange engaging bore 25a and the pressed-in portion 96 becomes engaged with the pressed portion engaging bore 25b.

Figure 30:
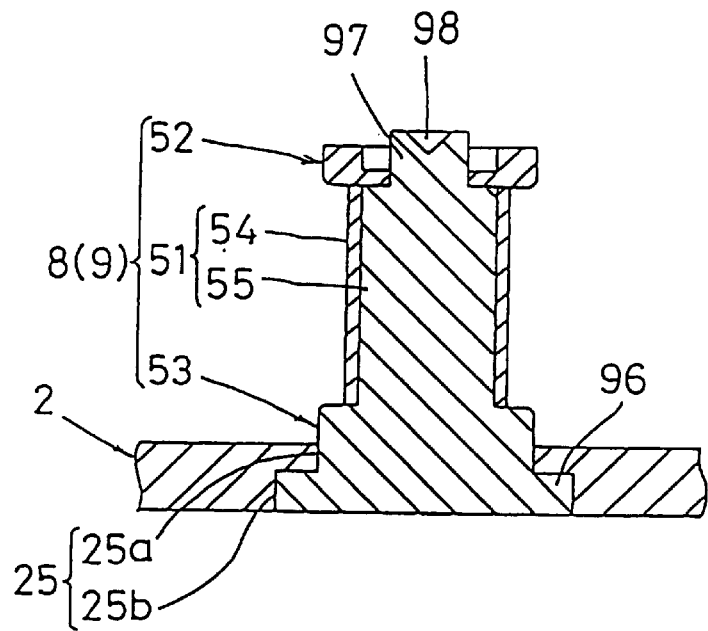
FIG. 30 is a view showing the process for assembling the tape guide.

Thereafter, as is shown in FIG. 30, the upper flange 52 is received onto the caulking fixing portion 97.

Figure 31:
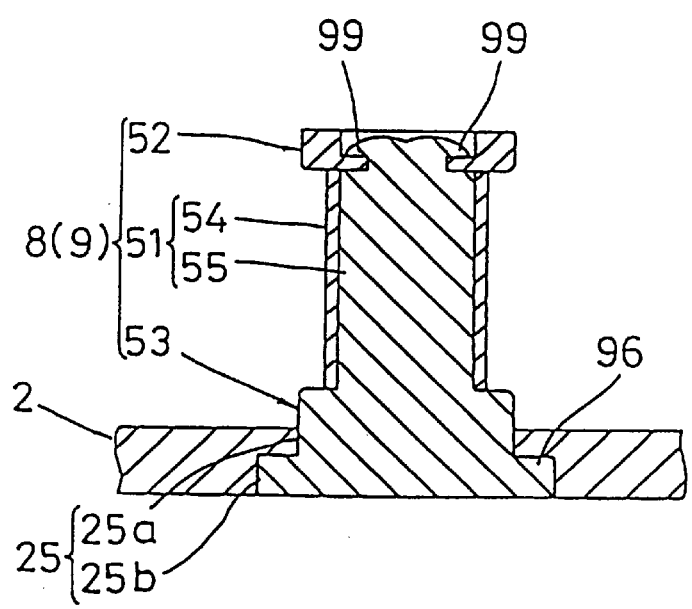
FIG. 31 is a view showing the process for assembling the tape guide.
Figure 32:
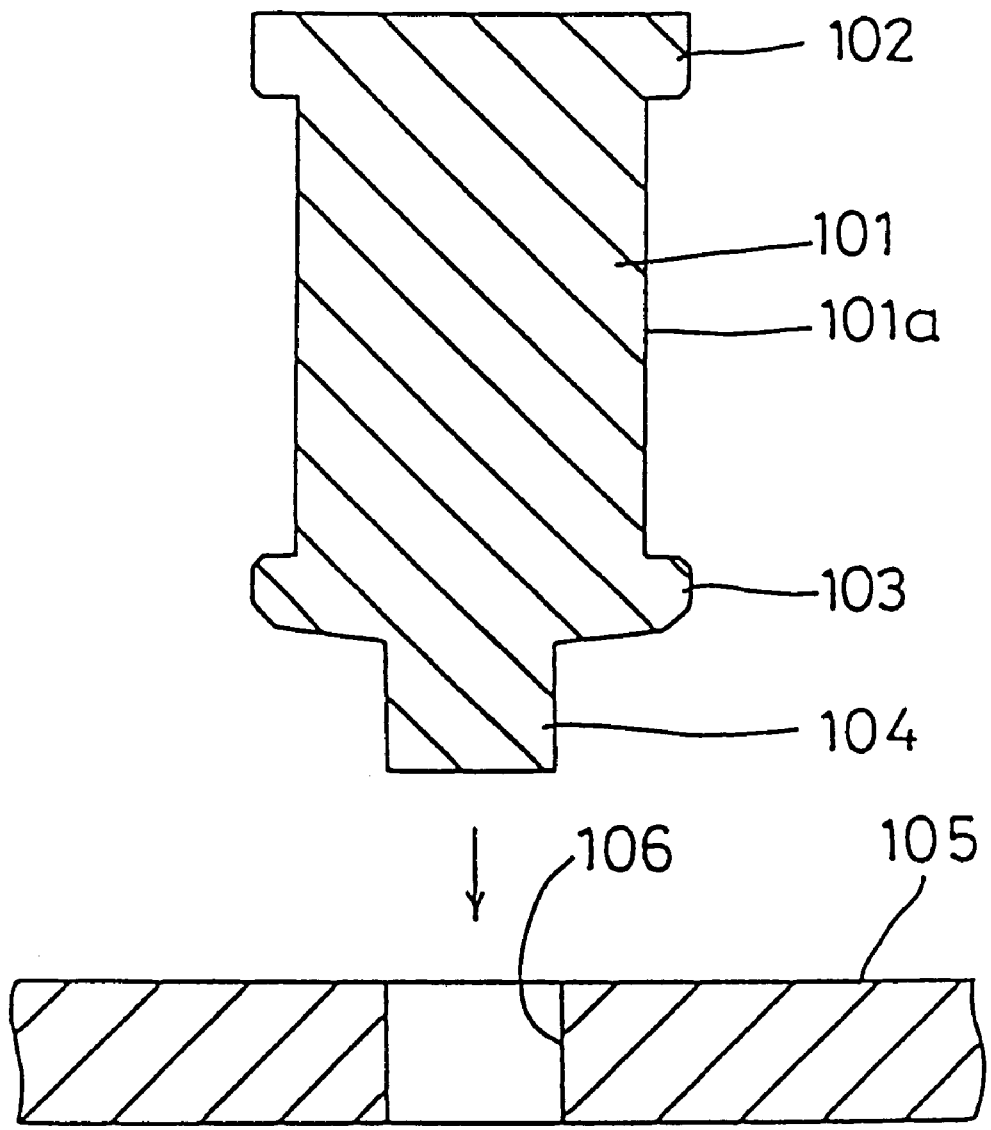
FIG. 32 is a sectional view of a conventional tape guide.

Then, as is seen from FIG. 31, by practically using the recess 98 (FIG. 30) formed on the upper surface of the caulking fixing portion 97, the caulking fixing portion 97 is enlarged thereby to form a caulked portion 99, so that between the caulked portion 99 and the pressed-in portion 96, there are sandwiched the upper and lower flanges 52 and 53, the cylindrical guide 54 and the insertion pin 55 permitting the tape guide 8 or 9 to stand on the base plate 2.

If desired, the cylindrical guide 54 and the insertion pin 55 may be provided through forging.

Since the tape cartridge of the present invention has the above-mentioned structure, it can be easily produced as compared with a conventional tape cartridge which uses a tape guide produced by applying a cutting work to a metal rod, and thus production cost can be reduced.

Furthermore, by changing the material of the shaft portion and the upper and lower flanges of the tape guide, the tape guide and/or the tape cartridge can be lightened.

I claim:

1. A tape cartridge in which a magnetic tape wound around a pair of tape reels is frictionally driven by a drive belt, the tape cartridge comprising:

a base plate;

said pair of tape reels around which said magnetic tape is wound, said tape reels being rotatably supported by respective reel shafts standing on said base plate;

upper and lower flanges each having a center opening at a center portion;

a tape guide including an upper fixing portion that passes through the center opening of said upper flange for having said upper flange secured thereto, a tape guide portion that guides said tape, and a lower fixing portion that passes through the center opening of said lower flange and into a fixing bore formed in said base plate for having both said lower flange and said base plate secured thereto, said tape guide standing on said base plate and guiding at said tape guide portion said magnetic tape between said pair of tape reels, at least one end of the tape guide having a deformable portion that is deformed to secure at least one of the upper and lower flanges;

said drive belt guided by a plurality of belt rollers rotatably held by respective roller shafts standing on said base plate, said drive belt frictionally driving said magnetic tape wound around said pair of tape reels;

a cover connected to said base plate in such a manner as to cover said magnetic tape on said base plate; and a lid portion arranged to selectively open and close a head insertion opening of said cover in such a manner as to enable a magnetic head to contact said magnetic tapes wherein said fixing bore comprises a portion with a diameter slightly larger than a diameter of said lower fixing portion to allow said lower fixing portion to pass therethrough, and a length of said lower fixing portion is greater than a sum of a thickness of said lower flange and a thickness of said portion of said fixing bore.

2. A tape cartridge according to claim 1, wherein said upper and lower flanges are circular plates.

3. A tape cartridge according to claim 1, wherein said upper fixing portion has a length exceeding a thickness of said upper flange.

4. A tape cartridge according to claim 1, wherein an end of said upper fixing portion, which extends through said center opening of said upper flange has a conical recess formed therein, an edge of said conical recess being deformed to form an enlarged flange portion for securing said upper flange to said tape guide.

5. A tape cartridge according to claim 1, wherein an end of said lower fixing portion, which extends through said center opening of said lower flange and into said fixing bore, has a conical recess formed therein, an edge of said conical recess being deformed to form an enlarged flange portion for securing said lower flange to said tape guide.

6. A tape cartridge according to claim 5, wherein said fixing bore further comprises:

a second portion with a diameter larger than the diameter of said portion creating a step between said portion and said second portion, wherein said enlarged flange portion is formed on said step between said portion and said second portion.

7. A tape cartridge according to claim 1, wherein said tape guide portion has a diameter greater than a diameter of said upper and lower fixing portions so as to form a first step between said tape guide portion and said upper fixing portion and a second step between said tape guide portion and said lower fixing portion.

8. A tape cartridge according to claim 7, wherein said upper flange contacts said first step and said lower flange contacts said second step.

9. A tape cartridge according to claim 1, wherein said tape guide is made of either:

non-magnetic stainless steel; or brass coated with a chrome or aluminum alloy.

10. A tape cartridge according to claim 1, wherein said upper and lower flanges are made of either:

non-magnetic stainless steel; or brass coated with a chrome or aluminum alloy.

11. A tape cartridge as claimed in claim 1, wherein the lower flange is disposed above an upper surface of said base plate.

12. A tape cartridge in which a magnetic tape is wound around a pair of tape reels, the tape cartridge comprising:

a base plate;

upper and lower flanges each having a center opening at a center portion;

a tape guide including an upper fixing portion that passes through the center opening of said upper flange for having said upper flange secured thereto, a tape guide portion that guides said tape, and a lower fixing portion that passes through the center opening of said lower flange and into a fixing bore formed in said base plate for having both said lower flange and said base plate secured thereto, said tape guide standing on said base plate and guiding at said tape guide portion said magnetic tape between said pair of tape reels, at least one end of the tape guide having a deformable conical recess formed therein that is deformed to secure at least one of the upper and lower flanges;

a cover connected to said base plate in such a manner as to cover said magnetic tape on said base plate; and a lid portion arranged to selectively open and close a head insertion opening of said cover in such a manner as to enable a magnetic head to contact said magnetic tape.

13. A tape cartridge according to claim 12, wherein said deformable conical recess is formed in an end of said upper fixing portion which extends through said center opening of said upper flange, an edge of said conical recess being deformed to form an enlarged flange portion for securing said upper flange to said tape guide.

14. A tape cartridge according to claim 12, wherein said deformable conical recess is formed in an end of said lower fixing portion, which extends through said center opening of said lower flange and into said fixing bore, an edge of said conical recess being deformed to form an enlarged flange portion for securing said lower flange to said tape guide.

15. A tape cartridge according to claim 14, wherein said fixing bore comprises:

a first portion with a diameter slightly larger than a diameter of said lower fixing portion to allow said lower fixing portion to pass therethrough; and a second portion with a diameter larger than the diameter of said first portion creating a step between said first and second portions, wherein said enlarged flange portion is formed on said step between said first and second portions.

16. A tape cartridge according to claim 12, wherein said tape guide portion has a diameter greater than a diameter of said upper and lower fixing portions so as to form a first step between said tape guide portion and said upper fixing portion and a second step between said tape guide portion and said lower fixing portion.

17. A tape cartridge as claimed in claim 12, wherein the lower flange is disposed above an upper surface of said base plate.

18. A method of forming a tape cartridge in which a magnetic tape is wound around a pair of tape reels, the method comprising:

forming a base plate;

forming upper and lower flanges each having a center opening at a center portion;

forming a tape guide including an upper fixing portion, a lower fixing portion and a tape guide portion, the upper and lower fixing portions each having a deformable end;

passing said upper fixing portion through the center opening of said upper flange;

deforming the deformable end of said upper fixing portion to form an enlarged flange portion for securing said upper flange to said tape guide;

pressing said lower fixing portion through the center opening of said lower flange and into a fixing bore formed in said base plate, wherein said fixing bore comprises a portion with a diameter slightly larder than a diameter of said lower fixing portion to allow said lower fixing portion to pass therethrough, and a length of said lower fixing portion is greater than a sum of a thickness of said lower flange and a thickness of said portion of said fixing bore;

deforming the deformable end of said lower fixing portion to form an enlarged flange portion for securing said tape guide to said base plate;

attaching a cover to said base plate in such a manner as to cover said magnetic tape on said base plate; and attaching a lid portion to selectively open and close a head insertion opening of said cover in such a manner as to enable a magnetic head to contact said magnetic tape.

19. A method according to claim 18, wherein said forming a tape guide comprises forming a conical recess in said end of said upper fixing portion, and said deforming an end of said upper fixing portion comprises deforming an edge of said conical recess to form the enlarged flange portion of the upper fixing portion.

20. A method according to claim 18, wherein said forming a tape guide comprises forming a conical recess in said end of said lower fixing portion, and said deforming an end of said lower fixing portion comprises deforming an edge of said conical recess to form the enlarged flange portion of the lower fixing portion.

* * * * *

UNITED STATES PATENT AND TRADEMARK OFFICE
CERTIFICATE OF CORRECTION

PATENT NO. : 6,057,992
DATED : May 2, 2000
INVENTOR(S) : Shuichi KIKUCHI et al.

It is certified that error appears in the above-identified patent and that said Letters Patent is hereby corrected as shown below:

Column 16, line 57, claim 18, line 19; delete "larder"

insert - -larger- -.

Signed and Sealed this

Eighth Day of May, 2001

Attest:

NICHOLAS P. GODICI

*Attesting Officer*  *Acting Director of the United States Patent and Trademark Office*